United States Patent
Haugland

(10) Patent No.: US 12,378,873 B1
(45) Date of Patent: Aug. 5, 2025

(54) SYSTEM AND METHOD FOR CONTINUOUS WELLBORE SURVEYING

(71) Applicant: GATECLIFF LLC, Reno, NV (US)

(72) Inventor: Samuel Mark Haugland, Reno, NV (US)

(*) Notice: Subject to any disclaimer, the term of this patent is extended or adjusted under 35 U.S.C. 154(b) by 0 days.

(21) Appl. No.: 17/869,638

(22) Filed: Jul. 20, 2022

Related U.S. Application Data

(60) Provisional application No. 63/223,604, filed on Jul. 20, 2021.

(51) Int. Cl.
*E21B 47/0228* (2012.01)
*G01V 11/00* (2006.01)

(52) U.S. Cl.
CPC .......... *E21B 47/0228* (2020.05); *G01V 11/00* (2013.01); *G01V 2210/70* (2013.01)

(58) Field of Classification Search
CPC .. E21B 47/022; E21B 47/024; E21B 47/0228; E21B 7/04; G01V 3/26; G01V 3/40; G01V 11/00; G01V 7/00; G01C 19/38; G01C 21/08; G01C 19/02; G01C 19/00; G01C 17/38
See application file for complete search history.

(56) References Cited

U.S. PATENT DOCUMENTS

| | | | |
|---|---|---|---|
| 3,862,499 A | 1/1975 | Isham et al. | |
| 4,682,421 A | 7/1987 | van Dongen et al. | |
| 4,709,486 A | 12/1987 | Walters | |
| 4,813,274 A | 3/1989 | DiPersio et al. | |
| 4,894,923 A * | 1/1990 | Cobern | E21B 47/022 33/304 |
| 5,623,407 A * | 4/1997 | Brooks | E21B 47/022 702/6 |
| 6,728,639 B2 | 4/2004 | Russell | |
| 9,273,547 B2 | 3/2016 | Brooks et al. | |
| 9,804,288 B2 | 10/2017 | Estes et al. | |
| 2006/0173627 A1 * | 8/2006 | Haugland | G01V 11/00 702/9 |
| 2013/0151157 A1 * | 6/2013 | Brooks | E21B 47/022 702/9 |
| 2017/0059324 A1 * | 3/2017 | Kim | G01C 17/02 |
| 2022/0251938 A1 * | 8/2022 | Whitmore | E21B 7/06 |

OTHER PUBLICATIONS

Panchal, Neilkunal, Martin T. Bayliss, and James F. Whidborne. "Attitude control system for directional drilling bottom hole assemblies." IET control theory & applications 6.7 (2012): 884-892. (Year: 2012).*

* cited by examiner

*Primary Examiner* — Yoshihisa Ishizuka
*Assistant Examiner* — Carter W Ferrell
(74) *Attorney, Agent, or Firm* — Karen B. Tripp

(57) ABSTRACT

The present invention provides non-transitory computer-readable media and systems are suitable for evaluating a dynamic wellbore azimuth and inclination measurement based on measurements acquired by a downhole tool capable of acquiring accelerometer (gravity) and magnetic field measurements representative of the earth's gravitational and magnetic fields. These non-transitory computer-readable media and systems can also be used for evaluating static inclination and azimuth measurements. These non-transitory computer-readable media and systems comprising the present invention provide an improvement over the prior art for their function and address many shortcomings of prior art.

27 Claims, 8 Drawing Sheets

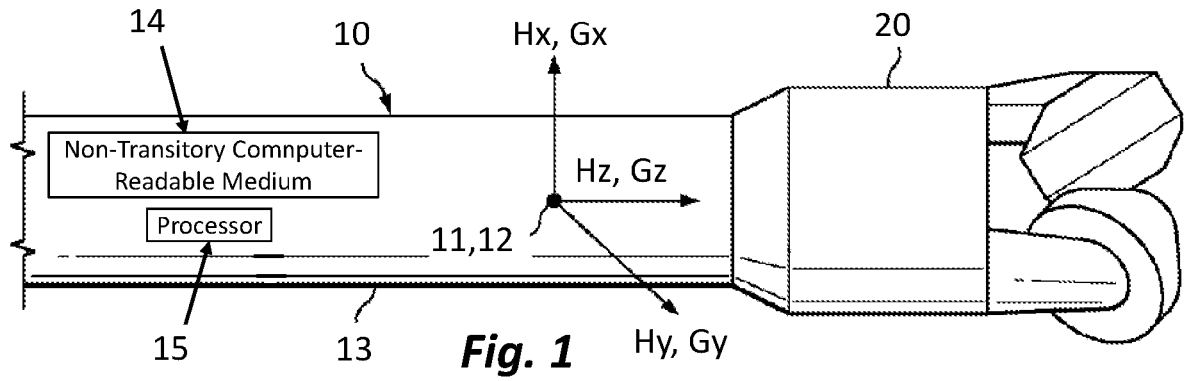
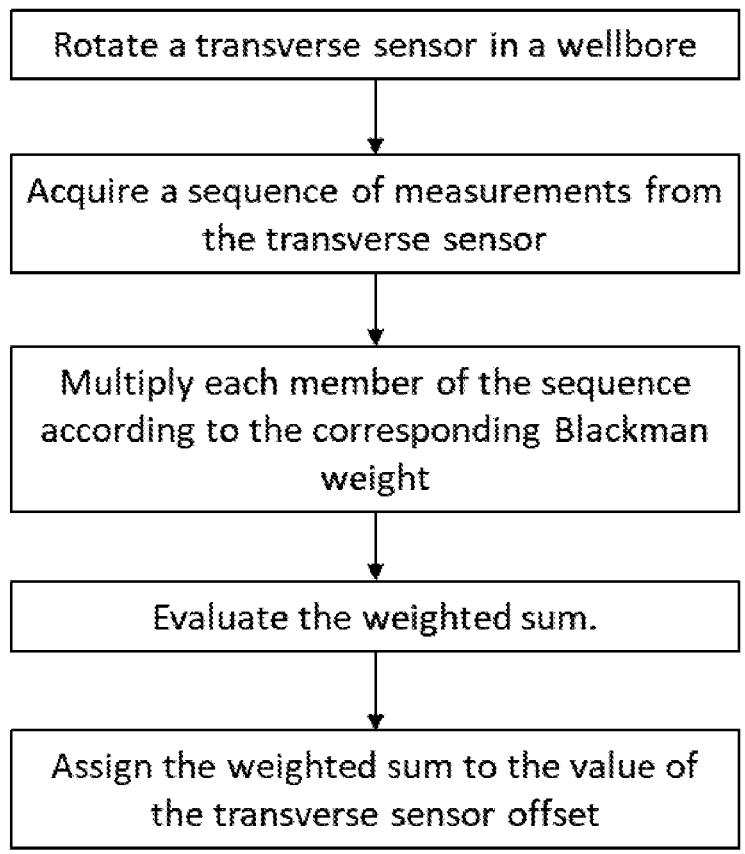

| t | h(t) | t | h(t) | t | h(t) |
|---|---|---|---|---|---|
| 0 | -2.3E-05 | 0.054 | -0.01497 | 0.108 | -0.00959 |
| 0.002 | 0.00002 | 0.056 | -0.01906 | 0.11 | -0.00405 |
| 0.004 | 0.000061 | 0.058 | -0.02067 | 0.112 | 0.00077 |
| 0.006 | 0.000127 | 0.06 | -0.0187 | 0.114 | 0.004299 |
| 0.008 | 0.000207 | 0.062 | -0.01232 | 0.116 | 0.006293 |
| 0.01 | 0.000278 | 0.064 | -0.00119 | 0.118 | 0.006811 |
| 0.012 | 0.000308 | 0.066 | 0.014436 | 0.12 | 0.006134 |
| 0.014 | 0.000258 | 0.068 | 0.033685 | 0.122 | 0.004673 |
| 0.016 | 0.000093 | 0.07 | 0.055091 | 0.124 | 0.002864 |
| 0.018 | -0.0002 | 0.072 | 0.076757 | 0.126 | 0.001097 |
| 0.02 | -0.00062 | 0.074 | 0.096573 | 0.128 | -0.00035 |
| 0.022 | -0.00109 | 0.076 | 0.112491 | 0.13 | -0.00132 |
| 0.024 | -0.00154 | 0.078 | 0.122801 | 0.132 | -0.00179 |
| 0.026 | -0.00182 | 0.08 | 0.12637 | 0.134 | -0.00182 |
| 0.028 | -0.00179 | 0.082 | 0.122801 | 0.136 | -0.00154 |
| 0.03 | -0.00132 | 0.084 | 0.112491 | 0.138 | -0.00109 |
| 0.032 | -0.00035 | 0.086 | 0.096573 | 0.14 | -0.00062 |
| 0.034 | 0.001097 | 0.088 | 0.076757 | 0.142 | -0.0002 |
| 0.036 | 0.002864 | 0.09 | 0.055091 | 0.144 | 0.000093 |
| 0.038 | 0.004673 | 0.092 | 0.033685 | 0.146 | 0.000258 |
| 0.04 | 0.006134 | 0.094 | 0.014436 | 0.148 | 0.000308 |
| 0.042 | 0.006811 | 0.096 | -0.00119 | 0.15 | 0.000278 |
| 0.044 | 0.006293 | 0.098 | -0.01232 | 0.152 | 0.000207 |
| 0.046 | 0.004299 | 0.1 | -0.0187 | 0.154 | 0.000127 |
| 0.048 | 0.00077 | 0.102 | -0.02067 | 0.156 | 0.000061 |
| 0.05 | -0.00405 | 0.104 | -0.01906 | 0.158 | 0.00002 |
| 0.052 | -0.00959 | 0.106 | -0.01497 | 0.16 | -2.3E-05 |

*Fig. 11*

SYSTEM AND METHOD FOR CONTINUOUS WELLBORE SURVEYING

RELATED PROVISIONAL APPLICATION

This application claims the benefit of U.S. Provisional Patent Application Ser. No. 63/223,604, filed Jul. 20, 2021, and entitled "System and Method for Continuous Wellbore Surveying" which is incorporated herein by reference in its entirety.

FIELD

This invention relates to measurement while drilling "MWD" methods and particularly to systems and methods for obtaining wellbore inclination and/or wellbore azimuth measurements in the drilling of subterranean wellbores or boreholes penetrating subterranean formations such as a hydrocarbon bearing reservoirs.

BACKGROUND

In conventional measurement while drilling, "MWD", wellbore inclination and wellbore azimuth are referred to as "inclination" and "azimuth" measurements. In this document, the terms inclination and azimuth will refer to a wellbore inclination and wellbore azimuth measurement respectively. Typically, inclination and azimuth are determined at a discrete number of longitudinal points along an axis of a wellbore by a device mounted on a drill collar. A collection of inclinations and azimuths is assembled into a wellbore survey and then used in conjunction with a set of distance (depth) measurements (typically along an axis of the well) to approximate a three-dimensional well trajectory. A well trajectory may be referred to as a well path.

The use of accelerometers, magnetometers, and gyroscopes are well known in such conventional wellbore surveying techniques for measuring inclination and/or azimuth. For example, prior art inclinations are derived from accelerometer measurements sensitive to the earth's gravitational field, independent of magnetometer or gyroscope measurements. Azimuth is most commonly derived from a combination of accelerometer and magnetometer measurements, the magnetometer measurements being sensitive to the earth's magnetic field.

A static inclination and azimuth measurement is made when drilling, where drill string rotation, and circulation of drilling fluid are not happening. That is, most commonly, a static inclination and azimuth are acquired when drilling is temporarily suspended to insert an additional length of drill pipe to facilitate lengthening the well. A dynamic inclination and azimuth measurement is generally made when drilling, when drill string rotation, or circulation of wellbore fluid is also happening.

Static measurements are often sufficient to obtain a first approximation to the actual well path. However, it is desirable to measure the wellbore inclination and wellbore azimuth under dynamic conditions including during drill string rotation, circulation of drilling fluid, or continuously while drilling as such measurements provide: 1) a more timely indication of the drilling direction and wellbore position; 2) a means for more accurately determining the location of the wellbore; 3) an improved indication of the local curvature (tortuosity) of the wellbore; 4) reduced risk of the drill string becoming stuck as a result of prolonged static conditions; and, 5) lower drilling costs due to time savings in taking the measurements. Dynamic measurements are valuable during drilling in both rotary and sliding modes of drilling.

Methods for making dynamic inclination and azimuth measurements are known and have been used in the prior art. However, there remains a need to improve the accuracy and reliability of dynamic measurements. This is significantly due to increased requirements for timely and accurate wellbore direction, position, quality, reduced drilling risks, and the high cost of drilling rig time. Some drivers behind the increased requirements are: 1) faster drilling speeds enabled by better drilling technology and needs to reduce drilling costs; 2) more precise identification of the location of drilling targets enabled by improved geophysical technology; 3) the need to more accurately space wells apart in an oilfield to improve reservoir drainage or hydraulic fracturing outcomes; 4) improved ability to control the direction of the drill bit; and, 5) reduced operational risks associated with loss of wells and/or bottom hole assemblies.

U.S. Pat. No. 3,862,499 describes a static surveying apparatus that measures three components of a gravity vector and three components of a magnetic vector. The inclination angle is based solely upon the gravity measurements, and the azimuth angle is determined by the gravity and magnetic measurements. This apparatus produces acceptable static results when measurement errors, sensor offsets, and time-dependent errors are negligible.

U.S. Pat. No. 4,682,421 describes a technique for correcting magnetic field measurements for errors due to the presence of magnetic bodies on the drill string that corrupt magnetometer measurements. Acquiring useful results from this technique is challenging because it requires both: 1) a pre-determined magnetic dip angle and a magnetic field magnitude to correct an axial magnetic measurement; and, 2) a plurality of static gravity tool face angle measurements in an inclined wellbore over various rotational orientations of the drill string. Use of the predetermined magnetic field magnitude is problematic because a residual sensor offset on a transverse magnetic field measurement is squared in a magnitude calculation and then added to the square of an axial residual sensor offset. Use of the plurality of static gravity tool face angles is a problem because acquiring static measurements is costly and risky.

U.S. Pat. No. 4,709,486 also requires measurements at a plurality of static device orientations (referred to in this present disclosure as tool face angles), and it relies on estimating the component of the magnetic field along the axis of the measurement device based on vector-valued gravity measurements and components of the magnetic field transverse to the device axis. The approach taken in U.S. Pat. No. 4,709,486 is problematic because the proxy for the axial magnetic field used to estimate every wellbore azimuth value is evaluated based on measurements acquired at a plurality of device orientations in a way that results in an ambiguity in the direction of the proxy for the axial magnetic field. U.S. Pat. No. 4,709,486 does not require a prior estimate of either a magnetic dip angle or a magnetic field magnitude.

U.S. Pat. Nos. 4,813,274, 4,894,923, and 6,728,639 specify and claim estimating a dynamic azimuth using an axial magnetic measurement. U.S. Pat. No. 4,894,923 discusses invariant quantities and averaging them, but not all invariants are discussed and the use of these quantities in evaluating the wellbore inclination and/or azimuth are not treated exhaustively. The invariant not discussed in U.S. Pat. No. 4,894,923 is the transverse magnetic field magnitude.

U.S. Pat. No. 9,273,547 is a recent example of an attempt to improve the quality of dynamic azimuth measurements.

U.S. Pat. No. 9,273,547 notes errors in dynamic azimuth measurements caused by the axial magnetic field being corrupted by "nearby drill string components (e.g., including the drill bit, a mud motor, a reaming tool, and the like)". In turn, this results in excessive errors in the dynamic azimuth measurement. Consequently, an estimate of the axial magnetic field is made from a measurement of the magnitude of the component of the magnetic field in the plane transverse to the device axis and a prior estimate of the magnitude of the total earth's magnetic field. U.S. Pat. No. 9,273,547 does not address the issue of determining the sign (+ or −) of the axial magnetic field or even mention that the equation taught in the patent for determining the wellbore azimuth suffers from this ambiguity.

An investigation of the equation taught and claimed in U.S. Pat. No. 9,273,547 for determining the cosine of the wellbore azimuth leads to the following conclusions: 1) the ambiguity in the sign of the longitudinal magnetic field results in significant difficulty in determining which sign it has when the longitudinal field is small, and this is a serious issue for drilling in many important scenarios including drilling substantially horizontal wells on an easterly or westerly heading; 2) because only the cosine of the azimuth is determined, the estimate lacks sensitivity and is ambiguous along and near the north-south axis where the cosine is close to +1; and, 3) it has the above mentioned problem using a predetermined magnetic field magnitude.

U.S. Pat. No. 9,273,547 also specifies using a "short collar correction" for the purpose of determining the wellbore azimuth. This equation has multiple solutions that have to be evaluated using a numerical equation solver. Complications are not easily resolved in relevant drilling scenarios which can include compounding of measurement errors, a poor measurement sensitivity for some inclination and azimuth values, and convergence to the wrong solution. The specification of U.S. Pat. No. 9,273,547 goes on to correct an axial magnetic measurement for drill string magnetization using a model but that model introduces additional sources of error because the model and its parameters are not exact. The '547 patent does not address the issue of determining a magnitude of the earth's gravity vector from dynamic measurements, and it relies on prior art for estimating an inclination. The specification of U.S. Pat. No. 9,273,547 advocates using static data or pre-determined results for determining a magnitude of the gravity vector.

U.S. Pat. No. 9,273,547 describes a problem with filter delays and eddy currents causing an error in the relative phase between the transverse magnetic and transverse gravity vectors that depends on the rate of rotation of the sensors. A relative phase error of about 13 degrees is observed at a rotation rate of only 140 rpm. The error increases with the rate of rotation, and rates of rotation substantially higher are not outlandish in many drilling applications. The relative phase error affects accuracy of the wellbore azimuth. The errors are problematic and not acceptable.

U.S. Pat. No. 9,804,288 describes using a nonlinear inversion to evaluate residual sensor offsets (or biases). Some embodiments use an adaptive filter, and sensor offsets are expected to be constant over an entire logging run, the method requires an additional input referred to as a "quality level," it provides a result for a magnetic sensor offset that depends on a gravity offset. Measurements are forced to agree with predetermined total field magnitudes assumed to be constant over the entire logging run, and local magnetic anomalies must be constant over an entire logging run. Adaptive filters are not guaranteed to converge and their behavior can be unpredictable when applied to data with arbitrary or otherwise unforeseen errors. Nonlinear inversions of the type described in U.S. Pat. No. 9,804,288 have multiple solutions, and consequent ambiguities can be seriously problematic on data sets with large offsets when compared to the correct measurement value.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present invention when read in conjunction with the accompanying drawings, wherein:

FIG. 1 is a schematic of a bottom hole assembly (BHA) with a three-axis magnetometer, a three-axis accelerometer, a non-transitory computer-readable medium, and a processor suitable for use in many embodiments of the present invention.

FIG. 2 is a flow chart of one method for evaluating a transverse sensor offset.

FIG. 11 is a table of coefficients for digital LPF used in two-stage sampling in a preferred embodiment of the invention.

SUMMARY

Figure 3:
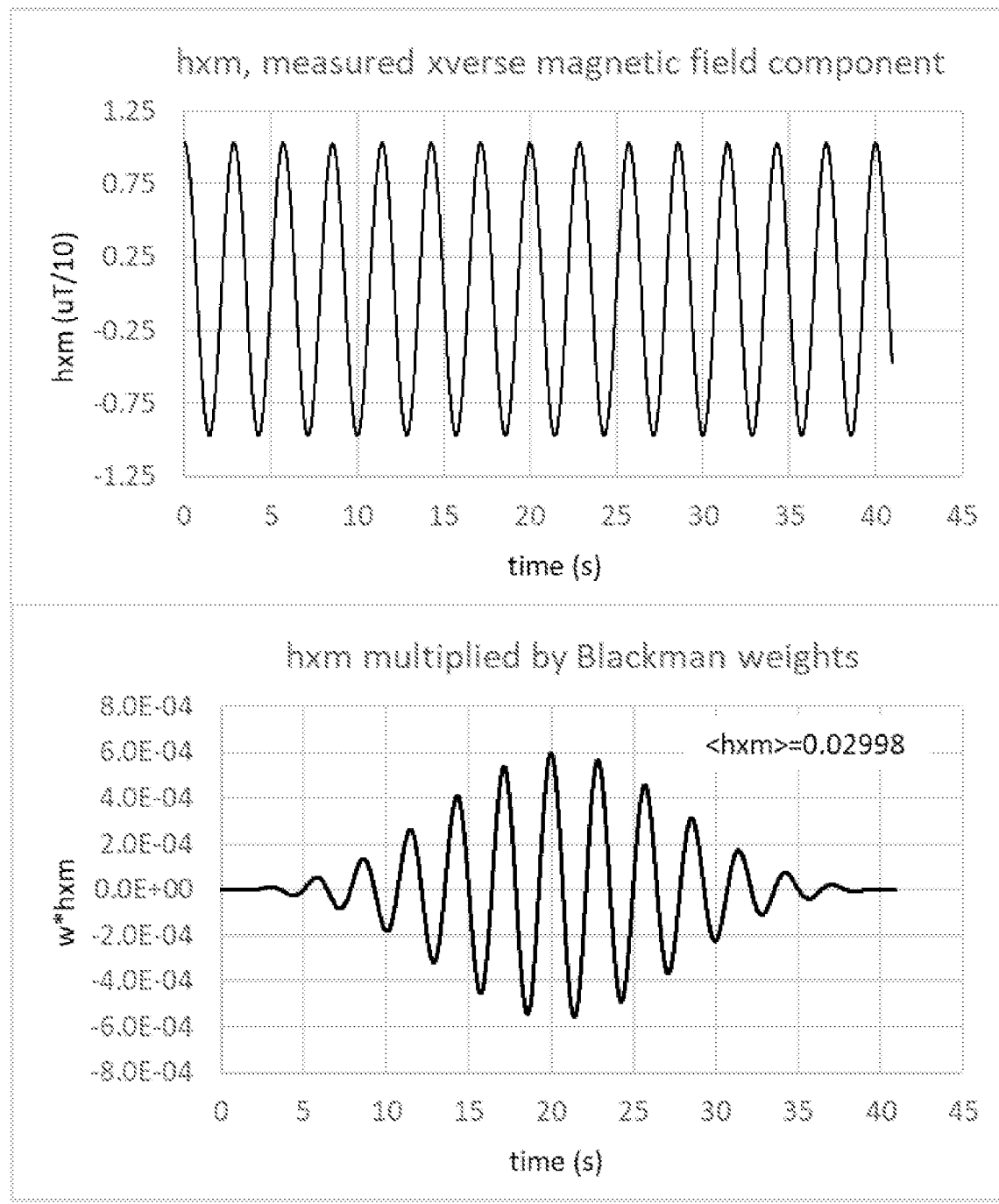
FIG. 3 is a pair of plots where the top panel shows a sequence of values representing the x-component of a measured transverse magnetic field, hxm, and the lower panel shows that same sequence multiplied by Blackman weights.

The present invention provides a non-transitory computer-readable medium storing one or more instructions that, when executed by a processor, cause the processor to use an averaged transverse product magnitude based on signals measured by a gravity sensor and a magnetic sensor in a wellbore for evaluating one or more of the group: i) an inclination, and ii) an azimuth.

The present invention also provides a system for wellbore surveying including a processor, a non-transitory computer-readable medium storing one or more instructions that, when executed by the processor, cause the processor to: evaluate an averaged transverse product magnitude using a sequence of transverse magnetic vectors measured by a magnetic sensor in a wellbore and a sequence of transverse gravity vectors measured by a gravity sensor in a wellbore; and, use the average transverse product magnitude to evaluate one or more of the group: i) an inclination, and ii) an azimuth.

The present invention further provides a system for wellbore surveying including a magnetic sensor in a wellbore; a gravity sensor in a wellbore; a means for evaluating an averaged transverse product magnitude using a sequence of transverse magnetic vectors measured by the magnetic sensor and a sequence of transverse gravity vectors measured by the gravity sensor; and, a means for using the averaged transverse product magnitude to evaluate one or more of the group: i) an inclination, and ii) an azimuth.

DETAILED DESCRIPTION

A first object of the present invention is to evaluate a transverse gravity or transverse magnetic sensor offset without: 1) requiring a prior gravity or magnetic field magnitude; 2) using an adaptive filter; 3) requiring a sensor offset to be constant over an entire logging run; 4) combining data from more than one sensor; or, 5) solving nonlinear equations. This objective is achieved according to the invention by forming a weighted sum of a sequence of sensor data wherein the weights correspond to a tapered window function. In a preferred embodiment for practicing this invention, this objective is accomplished using weights determined by a Blackman window function and applying them to form a weighted sum of data acquired while a transverse sensor is rotating.

A second object of the present invention is to evaluate an axial magnetic field (or an axial sensor offset) without: 1) using a plurality of static gravity tool face angle measurements in an inclined wellbore over various rotational orientations of the drill string; 2) a predetermined magnetic field magnitude; 3) resorting to a numerical equation solver, especially for equations with multiple solutions; 4) attempting to determine which of several ambiguous solutions for an azimuth angle is correct given a sign ambiguity in each one; 5) invoking a drill string magnetization model; 6) using an adaptive filter; or, 7) requiring local magnetic anomalies to be constant over an entire logging run. In a preferred embodiment for practicing the invention, an axial magnetic sensor offset is evaluated using the quadratic formula with a dependence on a predetermined magnetic dip value. Rotating sensor data are not required, but may be used advantageously to, for example, reduce effects of a transverse sensor offset. A so-determined axial magnetic sensor offset is determined under favorable dynamic conditions and retained in memory so that it can be applied to incoming axial magnetic measurements in a preferred embodiment of the invention.

A third object of this invention is to evaluate reliable estimates for an inclination and an azimuth angle under dynamic conditions without a predetermined: 1) total gravity magnitude; 2) total magnetic field magnitude; 3) transverse gravity magnitude; and, 4) transverse magnetic field magnitude. Accurate dynamic inclinations or azimuths can be based entirely on data acquired under dynamic conditions.

In a preferred embodiment for practicing this invention, an averaged transverse product magnitude is evaluated and used in novel formulas for the inclination and the azimuth. Formulas for the inclination are introduced with a dependency on transverse magnetic measurements. Preferred formulas of the invention for the azimuth angle have a different dependence on averaged gravity and magnetic measurements than do prior art formulas. To the knowledge of the inventor, an inclination measurement with a dependence on a magnetic measurement does not exist in the prior art. One advantage of using an averaged transverse product magnitude is that time-dependent errors on the dynamic transverse magnetic measurements tend to be small which makes them useful for estimating a transverse gravity magnitude.

A fourth object of the present invention to provide transverse gravity and transverse magnetic measurements without a relative phase error caused by sensor rotation. This object is achieved using a two-stage sampling procedure that includes a prior art calibration. In a preferred embodiment, each sensor signal passes through an analog low-pass filter, is digitized, digitally filtered, and calibrated before combining with a signal from a different sensor. Preferably, the digital filter output is sampled at a lower frequency than the data were digitized because the digital filtering operation reduces the Nyquist frequency, and the digital filter is a finite impulse response, low pass filter.

Statements that rotation-induced eddy currents contribute to this relative phase error are doubted because the device rotates about the axis which is the wrong geometry to induce eddy currents that would not cancel out over each revolution. Furthermore, a numerical calculation shows that such eddy currents would produce magnetic fields too weak to cause an adverse impact on a wellbore survey.

An important purpose of wellbore azimuth and inclination measurements is to estimate the tangent vector to the wellbore in a reference coordinate system. This enables evaluation of a wellbore trajectory using a number of tangent vector estimates in conjunction with corresponding distances along the wellbore axis. The reference coordinate system used in most practical applications has a z-axis parallel to the Earth's gravity vector and an x-axis in the direction of magnetic north. Differences between true and magnetic north are trivial to account for because the correction amounts to adding a constant angle to a wellbore azimuth measurement, the constant angle being the difference between true and magnetic north.

Systems and methods for acquiring representative values of the Earth's gravity vector using accelerometer measurements and the Earth's magnetic field using magnetometer measurements are known to those of ordinary skill in the art. The method and system presented here is applicable to measurements acquired by such systems. Typically, such a system comprises a three-axis accelerometer, a three-axis magnetometer, a processor for executing instructions, a memory module for storing data, and a communications module for transmitting measurements and processed results to a telemetry system to send to the surface. In many instances, measurements will be processed in the subsurface measurement apparatus and the results transmitted to the surface via mud pulse telemetry. Alternatively, the measurements or partially processed results can be transmitted to the surface and processed by a processor there.

FIG. 1 depicts a lower-most portion of a drill string including a bottom hole assembly (BHA) 10 housing a three-axis magnetometer 11 and a three-axis accelerometer 12. In the depicted embodiment, the sensors 11 and 12 are enclosed in a sensor housing 13, and they may be deployed as close to the drill bit 20 as possible. This invention can be practiced with any placement of the sensors in a drill string, the drill string typically inserted into a wellbore and used to drill the wellbore. Sensor 11 is a three-axis magnetometer or a magnetic sensor. Sensor 12 is a three-axis accelerometer or a gravity sensor. The sensor signals are typically processed by a processor 15 that executes instructions stored in a non-transitory computer-readable medium 14 in the BHA, the non-transitory computer-readable medium including instructions to evaluate an azimuth and an inclination. The azimuth and inclination are typically stored in a non-transitory computer-readable medium. Ordinarily, some of the results are telemetered to the surface using a prior art telemetry system and/or telemetered to other parts of the drill string by prior art means. Though the raw sensor signals can be stored in a non-transitory computer-readable medium 14, the volume of data can be large. For this reason, in the preferred embodiment for practicing this invention, averaged quantities derived from the sensor signals are stored in a non-transitory computer-readable medium. The averaged quantities can be used to evaluate the azimuth or inclination results such as those telemetered to the surface. In addition, the averaged quantities (or recorded versions of the sensor signals) can be downloaded to a second non-transitory computer-readable medium at the surface after drilling is completed where they can be further processed, reprocessed, or analyzed. An example of a set of averaged quantities that can be used to practice a simple embodiment of this invention comprises an averaged axial magnetic measurement, an averaged axial gravity measurement, an averaged transverse dot product, an averaged transverse cross product, and an averaged transverse magnetic field magnitude. These and other quantities suitable for storage or processing in a non-transitory computer-readable medium used to practice this invention are specified in the following. It will be understood by those of ordinary skill in the art that non-transitory computer-readable media comprise all computer-readable media except for a transitory, propagating signal. Thus, a non-transitory computer-readable medium refers to any data storage device that can store instructions which can be executed a processor or that can store data that can be operated on by the processor. Examples of commonly-used non-transitory computer-readable media include devices such as a hard drive, network attached storage (NAS), read-only memory, random-access memory, flash memory, a CD (Compact Discs)—CD-ROM, a CD-R, or a CD-RW, a DVD (Digital Versatile Disc), a magnetic tape, and other optical and non-optical data storage devices.

1 Coordinate Systems, Coordinate Transformations, and Transverse Vectors

In order to explain the operation of the present invention, it is helpful to express the Earth's gravity vector, $\bar{g}$, and the Earth's magnetic vector, $\bar{h}$ in a reference coordinate system, a wellbore coordinate system, and a device coordinate system. When expressed in a specific coordinate system, a vector and its components will be assigned a subscript to denote the relevant coordinate system. For example, $\bar{g}_r$ and $\bar{h}_r$ denote the vectors $\bar{g}$ and $\bar{h}$ in the reference, r coordinate system. Specifically, $$\bar{g}_r = g \begin{bmatrix} 0 \\ 0 \\ 1 \end{bmatrix}, \text{ and } \bar{h}_r = \begin{bmatrix} h_{xr} \\ 0 \\ h_{zr} \end{bmatrix} = h \begin{bmatrix} \cos(D) \\ 0 \\ \sin(D) \end{bmatrix}. \tag{1.1}$$

From equation (1.1), it is clear that: 1) the gravity vector is aligned with the positive $z_r$-axis; and, 2) the magnetic vector lies in the $x_r$-$z_r$ plane. This is consistent with the convention that the $z_r$-axis is down and the $x_r$-axis is in the direction of magnetic north. This choice of reference coordinate system is arbitrary and any other choice for the reference coordinate system is equivalent for the purposes of this invention. It is common to define $\bar{h}_r$ in terms of a magnitude, h, and a magnetic dip angle, D. This can be accomplished by substituting, $h_{xr}=h \cos(D)$ and $h_{zr}=h \sin(D)$ in equation (1.1). From the convention that the $x_r$-axis is in the direction of magnetic north, it follows that $h_{xr}>0$. The vectors in equation (1.1) can be normalized to be unit vectors and then the magnitudes need not be referenced.

A vector, $\bar{v}_w$, expressed in the wellbore coordinate system is related to its value, $\bar{v}_r$, in the reference coordinate system via the transformation, $$\bar{v}_w = \bar{R}_{wr}\bar{v}_r, \text{ where} \tag{1.2a}$$

$$\bar{R}_{wr} = \begin{bmatrix} \cos(\theta)\cos(\gamma) & \cos(\theta)\sin(\gamma) & \sin(\theta) \\ -\sin(\gamma) & \cos(\gamma) & 0 \\ -\sin(\theta)\cos(\gamma) & -\sin(\theta)\sin(\gamma) & \cos(\theta) \end{bmatrix}. \tag{1.2b}$$

The matrix $\bar{R}_{wr}$ represents the combination of a first rotation about the $z_r$-axis by the angle $\gamma$ followed by a second rotation about a y-axis by the angle $\theta$. An azimuth angle is $\gamma$, and an inclination angle is $\theta$. By convention, $0 \leq \theta \leq \pi$, and $-\pi < \gamma \leq \pi$. The invention can be practiced on the basis of alternative conventions for the range of the angles and is in no way limited to any specific convention.

Similarly, a vector $\bar{v}_d$ can be expressed in the device coordinate via the transformation, $$\bar{v}_d = \bar{R}_{dw}\bar{v}_w, \text{ where} \tag{1.3a}$$

$$\bar{R}_{dw} = \begin{bmatrix} \cos(\alpha) & \sin(\alpha) & 0 \\ -\sin(\alpha) & \cos(\alpha) & 0 \\ 0 & 0 & 1 \end{bmatrix}. \tag{1.3b}$$

The matrix $\bar{R}_{dw}$ represents a rotation about the $z_w$-axis by the angle $\alpha$. A tool face is the angle is $\alpha$, and, by convention, $-\pi < \alpha \leq \pi$.

A tangent vector to a wellbore expressed in the reference coordinate system is $$\bar{\tau} = \begin{bmatrix} -\sin(\theta)\cos(\gamma) \\ -\sin(\theta)\sin(\gamma) \\ \cos(\theta) \end{bmatrix}. \tag{1.4}$$

A transverse vector can be conveniently defined as the x and y-components of a vector. For example, a vector $\bar{v}$ can be written as follows:

$$\bar{v} = \begin{bmatrix} v_x \\ v_y \\ v_z \end{bmatrix} = \begin{bmatrix} \bar{v}_T \\ v_z \end{bmatrix} \text{ where} \tag{1.5a}$$

$$\bar{v}_T = \begin{bmatrix} v_x \\ v_y \end{bmatrix}. \tag{1.5b}$$

The z-component of a vector is referred to as an axial component or an axial value given that it is in the axial direction. This notation is helpful because vector operations in a transverse plane are used extensively in this specification.

2 Gravity and Magnetic Vectors Device Coordinate System

Applying the coordinate transformations (1.3) to $\bar{g}_w$ and $\bar{h}_w$ results in $$\bar{g}_d = \begin{bmatrix} g_{xd} \\ g_{yd} \\ g_{zd} \end{bmatrix} = g \begin{bmatrix} \sin(\theta)\cos(\alpha) \\ -\sin(\theta)\sin(\alpha) \\ \cos(\theta) \end{bmatrix}, \text{ and} \quad (2.1a)$$

$$\bar{h}_d = \quad (2.1b)$$

$$\begin{bmatrix} h_{xd} \\ h_{yd} \\ h_{zd} \end{bmatrix} = \begin{bmatrix} (h_{xr}\cos(\theta)\cos(\gamma) + h_{zr}\sin(\theta))\cos(\alpha) - h_{xr}\sin(\gamma)\sin(\alpha) \\ -(h_{xr}\cos(\theta)\cos(\gamma) + h_{zr}\sin(\theta))\sin(\alpha) - h_{xr}\sin(\gamma)\cos(\alpha) \\ -h_{xr}\sin(\theta)\cos(\gamma) + h_{zr}\cos(\theta) \end{bmatrix}.$$

The transverse components of $\bar{g}_d$ and $\bar{h}_d$ are discussed in detail sufficient to define transverse gravity and magnetic vectors according to equation (1.5):

$$\bar{g}_{Td} = \begin{bmatrix} g_{xd} \\ g_{yd} \end{bmatrix} = g \begin{bmatrix} \sin(\theta)\cos(\alpha) \\ -\sin(\theta)\sin(\alpha) \end{bmatrix}, \text{ and} \quad (2.2a)$$

$$\bar{h}_{Td} = \quad (2.2b)$$

$$\begin{bmatrix} h_{xd} \\ h_{yd} \end{bmatrix} = \begin{bmatrix} (h_{xr}\cos(\theta)\cos(\gamma) + h_{zr}\sin(\theta))\cos(\alpha) - h_{xr}\sin(\gamma)\sin(\alpha) \\ -(h_{xr}\cos(\theta)\cos(\gamma) + h_{zr}\sin(\theta))\sin(\alpha) - h_{xr}\sin(\gamma)\cos(\alpha) \end{bmatrix}.$$

3 Reference Values, Transverse Vector Operations, and Prior Art Inclination and Azimuth Formulas The present invention can be practiced with any means for determining $\bar{g}_r$ and $\bar{h}_r$ whenever a reference value is required. Those of ordinary skill in the art are familiar with means for determining reference values. One such option is to measure $\bar{g}_r$ and $\bar{h}_r$ directly with the measurement device before the measurement device is placed in the well or at a (preferably) nearby calibration facility. If this is done, corrections can be made for local variations in the gravity or magnetic vectors to account for the difference between gravity and magnetic vectors at a location where the reference values were acquired and a location where the angles are being estimated.

Those persons of ordinary skill in the art are able to make such corrections by means of mathematical models or via the use of tabulated data. Alternatively, those persons of ordinary skill in the art will understand that appropriate reference values can be estimated directly from subsurface measurements, and if necessary, corrections can also be applied to those values. For example, the following quantities derived from dot and cross-products involving $\bar{g}$ and $\bar{h}$ are:

$$|\bar{g} \cdot \bar{g}| = g \quad (3.1a)$$

$$\bar{g} \cdot \bar{h} = gh_{zr} = gh \sin(D) \quad (3.1b)$$

$$|\bar{g} \times \bar{h}| = gh_{xr} = gh \cos(D) \quad (3.1c)$$

$$|\bar{h} \cdot \bar{h}| = \sqrt{h_{xr}^2 + h_{zr}^2} = h \quad (3.1d)$$

where the symbols · and × respectively represent a dot product and a cross product. These quantities are invariant under the coordinate transformations discussed above; so, it is not necessary to denote which coordinate system the underlying $\bar{g}$ and $\bar{h}$ measurements were acquired in. Values for $g$, $h$, $h_{xr}$, and $h_{zr}$ in equation (1.1) can be estimated directly from equation (3.1).

Transverse Vector Operations.

Per equation (1.5), transverse gravity and magnetic vectors are $\bar{g}_T$ and $\bar{h}_T$. The following definitions will be used:

Transverse magnetic magnitude: $h_r = |\bar{h}_T| = \sqrt{h_x^2 + h_y^2}$; (3.2a)

Transverse gravity magnitude: $g_T = |\bar{g}_T| = \sqrt{h_x^2 + h_y^2}$; (3.2b)

Transverse *dot* product: $\bar{g}_T \cdot \bar{h}_T = g_x h_x + g_y h_y = g_T h_T \cos(B)$; (3.2c)

Transverse cross product: $\bar{g}_T \times \bar{h}_T = g_x h_y - g_y h_x = g_T h_T \sin(B)$; (3.2d)

Transverse product magnitude: $g_T \times h_T = \sqrt{(\bar{g}_T \cdot \bar{h}_T)^2 + (\bar{g}_T \times \bar{h}_T)^2}$. (3.2e)

The angle B is known as a tool face offset. This angle can be determined using a four-quadrant (or two-argument) arctangent function, Tool face offset: $B = a \tan 2(\bar{g}_T \times \bar{h}_T, \bar{g}_T \cdot \bar{h}_T)$. (3.3)

This arctangent function does not require its arguments to be normalized such that their squares sum to one. Use of an arctangent function with two arguments requiring normalized arguments or any other arctangent function is equivalent for the purpose of practicing any embodiment of this invention. A tool face offset is not computed, evaluated, or used in the practice of this invention. It is defined here for completeness because it is a commonly-referenced quality control measure in wellbore surveying.

The term transverse product magnitude will be used to refer to a value for $g_T h_T$ evaluated according to (3.2). A transverse product magnitude is independent of a tool face offset. An averaged transverse product magnitude can be evaluated using averaged transverse dot product and an averaged transverse cross product.

Prior Art Inclination and Azimuth Formulas.

Prior art estimates of an inclination angle are based upon one or more measured gravity values and no magnetic measurements. This prior art approach is problematic because the prior art formulas such as $$\cos(\theta) = g_{zd}/g, \quad (3.4a)$$

$$\sin(\theta) = g_{Td}/g, \text{ or} \quad (3.4b)$$

$$\tan(\theta) = g_{Td}/g_{zd} \quad (3.4c)$$

all require a gravity magnitude estimate or a transverse gravity magnitude estimate to be derived from a set of measured gravity vectors. However, in a dynamic setting, shock and vibration effects do not readily average out of magnitude calculations because the errors in the individual measurements are squared and do not tend to cancel out when they are aggregated. A typical solution for this is to evaluate a gravity magnitude based on static data and then evaluate a dynamic transverse gravity magnitude using the formula $$g_{Td} = \sqrt{g^2 - g_{zd}^2}. \quad (3.5)$$

However, this solution results in static data being required for a dynamic inclination which poses practical problems because measurement errors are not the same in static and dynamic conditions.

Prior art estimates for an azimuth angle are typically evaluated according to the formula $$\gamma = a \tan 2(g\bar{g}_{Td} \times \bar{h}_{Td}, h_{zd}g_{Td}^2 - g_{zd}\bar{g}_{Td} \cdot \bar{h}_{Td}), \quad (3.6a)$$

which has a problematic dependency on various gravity magnitudes for dynamic applications. Challenges with magnetic interference have also been known, especially with systematic errors on $h_{zd}$, in high latitudes or during horizontal drilling in close to an easterly or westerly direction. Transverse sensor offsets are also known to adversely impact the quality of inclination and azimuth measurements. Transverse sensor offsets are thus very difficult to estimate according to prior art based data acquired under static conditions because the sensor is not rotating.

4 Measured Values and Error Suppression

Gravity and magnetic vectors in a device coordinate system specify a dependence of a measured gravity or magnetic vector on the inclination and azimuth angles. In the absence of measurement errors, an inclination and azimuth could be determined accurately based on a single measurement of a gravity and a magnetic vector and a prior art inclination and azimuth formula.

In practice, a measured gravity vector $\bar{g}_m$ and magnetic vector $\bar{h}_m$ include a residual offset vector and noise vector:

$$\bar{g}_m = \begin{bmatrix} \bar{g}_{Tm} \\ g_{zm} \end{bmatrix} = \begin{bmatrix} \bar{g}_{Td} \\ g_{zd} \end{bmatrix} + \begin{bmatrix} \Delta\bar{g}_T \\ \Delta g_z \end{bmatrix} + \begin{bmatrix} \bar{n}_{Tg} \\ n_{zg} \end{bmatrix} = \bar{g}_d + \Delta\bar{g} + \bar{n}_g, \quad (4.1a)$$

$$\bar{h}_m = \begin{bmatrix} \bar{h}_{Tm} \\ h_{zm} \end{bmatrix} = \begin{bmatrix} \bar{h}_{Td} \\ h_{zd} \end{bmatrix} + \begin{bmatrix} \Delta\bar{h}_T \\ \Delta h_z \end{bmatrix} + \begin{bmatrix} \bar{n}_{Th} \\ n_{zh} \end{bmatrix} = \bar{h}_d + \Delta\bar{h} + \bar{n}_h, \quad (4.1b)$$

where the vectors $\Delta\bar{g}$ and $\Delta\bar{h}$ represent a residual offset which can be referred to as an offset or a sensor offset. The vectors $\bar{n}_g$ and $\bar{n}_h$ represent time-dependent errors that can be referred to as "noise", and these vectors may be referred to as noise vectors.

A plurality of measurements is useful for suppressing effects of measurement errors on an inclination or an azimuth measurement. Therefore, it is advantageous to acquire multiple measured vectors over a time interval. The time interval will be referred to as a processing window. The present invention can be practiced with any processing window.

In a preferred embodiment for practicing this invention: the processing window is 40.96 seconds long; a value for $\bar{g}_m$ and $\bar{h}_m$ is acquired every 10 milliseconds (sample rate 100 Hz); the plurality of measurements comprises a sequence with 4096 values for $\bar{g}_m$ and $\bar{h}_m$; each transverse gravity vector is measured at substantially the same time as each transverse magnetic vector; and, each axial value is measured at substantially the same time as the transverse vectors.

The offsets in equations (4.1a) and (4.1b) are referred to as residual because, given an ideal measurement calibration, they would be negligible. A residual offset is expected when using a prior art calibration method. Examples of things that can cause a calibration error include an error in a reference field value, an error in the orientation of the sensor during calibration, human error, perturbations to a magnetic measurement caused by magnetic material in a bottom hole assembly, or damage to electrical or mechanical components in the measurement apparatus.

Some of the measurements in a processing window may be excluded from subsequent calculations. Those persons of ordinary skill in the art are familiar with means for excluding unrepresentative data from calculations. For example, a quantile filter that removes outlying data points from a set of data is applicable for this purpose. Alternatively, data corresponding to some number of standard deviations beyond a mean value can be excluded, etc. Instead of excluding undesirable members of a set of measurements, a quantile filter can alternatively be used to select a desirable member of a set such one close to a median or mean value. Even though as few as one of a plurality of measurements may be selected by such means, the use of a quantile filter requires multiple data points; so, any such selection is a combination of multiple data points that can change if more data are added to the plurality or taken away from the plurality of data. A preferred embodiment for practicing this invention is to simply use the data in the processing window without attempting to remove lesser-quality samples or identify a suitable sample.

A set of measurements acquired over a processing window will be enclosed by brackets to indicate an average, aggregation, selection from, or other combination of the set of measurements. A bracketed quantity with a subscript d indicates a quantity in the device coordinate system suitable to use for evaluating an inclination or azimuth. A quantity within brackets assigned a subscript m represents an average, aggregation, or combination of a set of measurements. For example, the equation $$\langle \bar{g}_{Td} \cdot \bar{h}_{Td} \rangle = \langle \bar{g}_{Tm} \cdot \bar{h}_{Tm} \rangle - \langle \bar{g}_{Tm} \rangle \cdot \langle \bar{h}_{Tm} \rangle$$

represents an averaged dot product of transverse gravity and magnetic vectors that is a proxy for the value of the averaged dot product in the device coordinate system fit for use in an inclination or azimuth measurement. It is based on an averaged set of measured transverse dot products, $\langle \bar{g}_{Tm} \cdot \bar{h}_{Tm} \rangle$ and the dot product of estimated offset vectors estimated according to $\langle \bar{g}_{Tm} \cdot \bar{h}_{Tm} \rangle$.

Transverse Sensor Offsets.

Data windowing using a tapered window function is a signal processing technique applicable for determining a transverse sensor offset. Windowing a sequence of measurements produces a weighted average of the sequence that is weighted more heavily toward the center than at the ends. A tapered window function is useful for mitigating "end effects" that result from a finite processing window. In a preferred embodiment for practicing this invention, a transverse sensor offset is determined using measurements acquired while a sensor is rotating. Weights determined by a suitable window function such as a Blackman window result in an acceptable approximation to a transverse sensor offset. In a preferred embodiment for practicing this invention, a Blackman window of length 4096, is effective to evaluate sensor offsets large enough to impact an inclination or azimuth calculation.

As a sensor rotates, the noise varies, and the offsets are approximately constant over the processing window. To an acceptable approximation, $$\langle \bar{g}_{Tm} \rangle = \Sigma_k w(k) \bar{g}_{Tm}(k) = \Delta \bar{g}_{Tm}, \quad (4.2a)$$

$$\langle \bar{h}_{Tm} \rangle = \Sigma_k w(k) \bar{h}_{Tm}(k) = \Delta \bar{h}_{Tm}, \quad (4.2b)$$

The summation index, k, runs from 0 to N−1 in (4.2). The coefficients, w(k), represent the tapered window function, $\bar{g}_{Tm}(k)$ and $\bar{h}_{Tm}(k)$ are the kth sample in a sequence of measurements. Numerous other suitable window functions are available.

The Blackman window is especially useful because it is simple and effective. Other common tapered window functions are a Gaussian window, triangular window, Parzen window, Welch window, Hann window, Hamming window, and more described in https://en.wikipedia.org/wiki/Window_function.

The weights for a Blackman window function are defined by the equation, $$p(k)=0.42-0.5\cos(2\pi(k-1)/(N-1))+0.08\cos(4\pi(k-1)/(N-1)), \quad (4.3a)$$

$$w(k)=p(k)/\Sigma_k p(k). \quad (4.3b)$$

The denominator of (4.3b) is a normalization factor that ensuring that $\Sigma_k w(k)=1$.

In a preferred embodiment for practicing this invention, the approximated offsets $\langle \bar{g}_{Tm} \rangle$ and $\langle \bar{h}_{Tm} \rangle$ are stored in memory and subtracted from their respective transverse vector on command. In most practical scenarios, the transverse offsets vary slowly in time and need not be evaluated as frequently as an inclination or azimuth value is required.

A rectangular window function has equal weights that are not tapered. Its use results in a simple arithmetic average of the data and the results are less accurate because a measurement sequence is truncated at both ends of the processing window. Thus, using a rectangular window for this application is not desirable for the purpose of estimating a transverse sensor offset, especially when the processing window encompasses only a few revolutions of the sensor.

FIG. 2 is a flow chart showing steps for an embodiment of the invention where a transverse sensor offset is evaluated. A transverse sensor rotates while a sequence of measurements from the transverse sensor is acquired. Each member of the sequence is multiplied by the corresponding Blackman weight. The weighted sum is then evaluated. The sensor offset is assigned the value of the weighted sum.

FIG. 3 illustrates the performance of an estimate in a preferred embodiment of the invention for the offset for $\Delta h_{xm} = \langle h_{xm} \rangle$ evaluated according to equation (4.2b). The top panel in FIG. 3 shows a sequence of values representing the $h_{xm}$ with an offset of 3 uT. In the lower panel, it is multiplied by Blackman weights. The preferred embodiment estimate for the offset is $\langle h_{xm} \rangle = 0.29980$ uT. A simple arithmetic average of unweighted data results in an estimate of 0.4 uT for the offset, over a 30% error.

Noise Reduction on Quantities Derived from Transverse Fields.

In a preferred embodiment for practicing this invention, the same window function used to approximate the sensor offsets $\langle \bar{g}_{Tm} \rangle$ and $\langle \bar{h}_{Tm} \rangle$ is applied in evaluating averaged transverse dot and cross products of $\bar{g}_{Tm}$ and $\bar{h}_{Tm}$. These averaged transverse dot and cross products are used with the approximated sensor offsets as follows:

$$\langle \bar{g}_{Td} \cdot \bar{h}_{Td} \rangle = \langle \bar{g}_{Tm} \cdot \bar{h}_T \rangle - \langle \bar{g}_{Tm} \rangle \cdot \langle \bar{h}_{Tm} \rangle \quad (4.4a)$$

$$\langle \bar{g}_{Td} \cdot \bar{h}_{Td} \rangle = \langle \bar{g}_{Tm} \cdot \bar{h}_{Tm} \rangle - \langle \bar{g}_{Tm} \rangle \times \langle \bar{h}_{Tm} \rangle \quad (4.4b)$$

Equations (4.4a) and (4.4b) are respectively useful for suppressing adverse effects caused by time-dependent measurement errors. In (4.4), $$\langle \bar{g}_{Tm} \cdot \bar{h}_{Tm} \rangle = \Sigma_k w(k) \bar{g}_{Tm}(k) \cdot \bar{h}_{Tm}(k) \quad (4.5a)$$

$$\langle \bar{g}_{Tm} \cdot \bar{h}_{Tm} \rangle = \Sigma_k w(k) \bar{g}_{Tm}(k) \times \bar{h}_{Tm}(k) \quad (4.5b)$$

It follows that an averaged transverse product magnitude is:

$$\langle g_{Td} h_{TD} \rangle = \sqrt{\langle \bar{g}_{Td} \cdot \bar{h}_{Td} \rangle^2 + \langle \bar{g}_{Td} \times \bar{h}_{Td} \rangle^2}. \quad (4.6)$$

An averaged transverse product magnitude is useful for an averaged $\langle g_{Td} \rangle$ given an averaged value for $\langle h_{Td} \rangle$, or for approximating an averaged $\langle h_{Td} \rangle$ given a value for averaged $\langle g_{Td} \rangle$ given the definition:

$$\langle g_{Td} \rangle \langle h_{Td} \rangle = \langle g_{Td} h_{Td} \rangle \quad (4.7)$$

In a preferred embodiment for practicing this invention, a value for $\langle g_{Td} \rangle$ is evaluated by dividing an averaged transverse product magnitude by a value for $\langle h_{Td} \rangle$. This is a much better way to evaluate an averaged transverse gravity magnitude than averaging a sequence of transverse gravity magnitude values because $\langle h_{Td} \rangle$ can be evaluated to an acceptable accuracy in nearly all practical cases because the noise vector associated with $\bar{h}_{Tm}$ tends to be relatively small. In contrast, the noise vector associated with $\bar{g}_{Tm}$ tends to be relatively large because of mechanical shock and vibration that happens under dynamic conditions.

In a preferred embodiment for practicing this invention, $$\langle h_{Td} \rangle = ([\Sigma_k w(k) \bar{h}_{Tm}(k) \cdot \bar{h}_{Tm}(k)] - \langle \bar{h}_{Tm} \rangle \cdot \langle \bar{h}_{Tm} \rangle)^{0.5}. \quad (4.8)$$

Various products of sensor offsets subtracted from the weighted sums in equations (4.4a), (4.4b), and (4.8). Because the sensor offsets tend to be small quantities and they are multiplied together, their products tend to be very small and can be ignored in many cases. Though this is not a preferred embodiment for practicing the invention, it is simpler and provides adequate accuracy in many practical circumstances. Thus, an alternative embodiment is to respectively replace (4.4a), (4.4b), and (4.8) with:

$$\langle \bar{g}_{Td} \cdot \bar{h}_{Td} \rangle = \langle \bar{g}_{Tm} \cdot \bar{h}_{Tm} \rangle, \quad (4.9a)$$

$$\langle \bar{g}_{Td} \times \bar{h}_{Td} \rangle = \langle \bar{g}_{Tm} \cdot \bar{h}_{Tm} \rangle, \text{ and} \quad (4.9b)$$

$$\langle h_{Td} \rangle = \sqrt{\langle \bar{h}_{Tm} \cdot \bar{h}_{Tm} \rangle}. \quad (4.9c)$$

The preferred embodiments are equally applicable to static and dynamic scenarios. Embodiments involving (4.9a)-(4.9c) have the potential to be more susceptible to residual transverse sensor offsets if the device is not rotating, but acceptable practical results may be achieved in many cases of interest even if the device is not rotating.

The sensor offsets are evaluated using a tapered window function. Though it is preferable to evaluate averaged dot and cross products of the transverse gravity and magnetic measurements using that tapered window function, the present invention can be practiced with any means for averaging, aggregating, combining, or selecting a member of a set of measured transverse dot and cross products. This is also true for evaluating a transverse magnetic magnitude where a preferred embodiment is to use equation (4.8), but the invention can be practiced with any means for evaluating an average, aggregation, combination, or selecting a member of a set of transverse magnetic measurements leading to an estimate for a transverse magnetic magnitude. To the extent that a tapered window function is a limitation on the invention, it is a limitation only for evaluating a transverse sensor offset.

Figure 4:
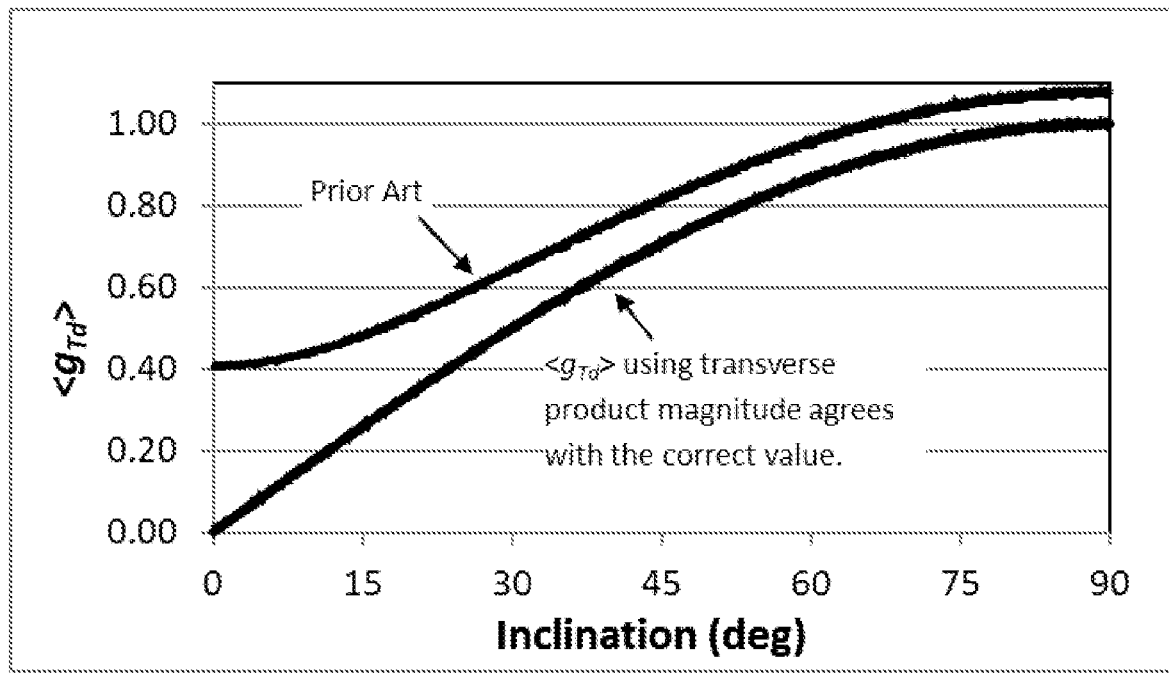
FIG. 4 is a plot comparing prior art estimates for a dynamic transverse gravity magnitude against estimates evaluated using an averaged transverse product magnitude and the true values according to an embodiment of the present invention.

FIG. 4 provides a comparison of a preferred embodiment practice for evaluating $\langle g_{Td} \rangle = \langle g_{Td} h_{Td} \rangle / \langle h_{Td} \rangle$ against a prior art average of transverse gravity values using equation (3.2b). The estimate using the averaged transverse product magnitude can't be distinguished from the correct values which are also displayed in FIG. 4. The prior art estimates are uniformly high. Biased errors of this type are not acceptable. The rms vibration assumed in these calculations is 0.125 g.

An alternative missing in the prior art is the use of correlation detection to evaluate a transverse field magnitude or a transverse product magnitude. This is discussed in detail below under the heading, "Transverse field correlations and enhanced noise rejection.".

Axial Magnetic Offset.

Axial magnetic measurements have to be especially accurate because, in many practical scenarios, even a small calibration error on an axial magnetic measurement can make a big impact on an estimated azimuth angle. A novel equation for evaluating an axial magnetic field value based on an axial gravity measurement, a transverse gravity measurement, a transverse magnetic measurement, and a predetermined magnetic dip angle is useful for this purpose. This equation is $$\langle h_{zd}(a, b, c) \rangle = \frac{-b \pm \sqrt{b^2 - 4ac}}{2a}, \text{ where} \quad (4.10a)$$

$$a = g_{Td}^2 \sin^2(D) - g_{zd}^2 \cos^2(D), \quad (4.10b)$$

$$b = -2g_{zd}\bar{g}_{Td}\cdot\bar{h}_T, \quad (4.10c)$$

$$c = (\bar{g}_{Td} \times \bar{h}_{Td})^2 + g_{zd}^2 h_{Td}^2 \sin^2(D) - g_{Td}^2 h_{Td}^2 \cos^2(D), \text{ and} \quad (4.10d)$$

the constant D is a known magnetic dip value determined using prior art. Equation (4.10a) is means for evaluating an axial magnetic field without a predetermined value for a magnetic field magnitude. A value for $\langle h_{zd}(a, b, c) \rangle$ estimated using equations (4.10a), (4.10b), (4.10c), and (4.10d) can be used directly in a formula for an azimuth angle in the practice of this invention. Alternatively, a sensor offset can be evaluated by subtracting a $h_z$-value evaluated according to (4.10) from a measurement of $h_{zm}$.

In a preferred embodiment for practicing this invention, an averaged measurement $\langle h_{zm} \rangle$ is used to evaluate the axial offset according to the equation $$\Delta h_z = \langle h_{zm} \rangle - \langle h_{zd}(a,b,c) \rangle, \quad (4.11)$$

where the $\langle h_{zm} \rangle$ can be any combination of more than one $h_{zm}$ values or even a single $h_{zm}$ value, but is most advantageously evaluated according to the formula $$\langle h_{zm} \rangle = \Sigma_k w(k) h_{zm}(k), \quad (4.12)$$

where the sum is evaluated in the same manner in equation (4.2a) and (4.2b), and the same tapered window function is used. Typically, this sensor offset varies slowly over time and need not be evaluated frequently. Thus, a value for $\Delta h_z$ can be evaluated under advantageous dynamic conditions, stored in memory, and applied to data acquired over another processing window.

In a preferred embodiment for practicing this invention, a transverse magnitude product is used, and $$a = \langle g_{Td} h_{Td} \rangle^2 \sin^2(D) / \langle h_{Td} \rangle^2 - \langle g_{zd} \rangle^2 \cos^2(D), \quad (4.13a)$$

$$b = -2 \langle g_{zd} \rangle \langle \bar{g}_{Td} \cdot \bar{h}_{Td} \rangle, \quad (4.13b)$$

$$c = \langle \bar{g}_{Td} \times \bar{h}_{Td} \rangle^2 + \langle g_{zd} \rangle^2 \langle h_{Td} \rangle^2 \sin^2(D) - \langle g_{Td} h_{Td} \rangle^2 \cos^2(D), \text{ and} \quad (4.13c)$$

$$\langle g_{zd} \rangle = \langle g_{zm} \rangle = \Sigma_k w(k) g_{zm}(k), \quad (4.13d)$$

where $\langle g_{zd} \rangle$ in equation (4.13d) is evaluated in the same manner explained for equations (4.2a) and (4.2b). Given a value for $\Delta h_z$ determined as described above, an estimate for $\langle h_{zd} \rangle$ that can be used in evaluating an azimuth is $$\langle h_{zd} \rangle = \langle h_{zm} \rangle - \Delta h_z, \quad (4.14)$$

where $\langle h_{zm} \rangle$ represents an average of axial magnetic measurements, preferably evaluated using a tapered window function, and $\Delta h_z$ may be predetermined or evaluated contemporaneously with $\langle h_{zm} \rangle$ in (4.14). In the contemporaneous case, equation (4.14) is equivalent to assigning $\langle h_{zd} \rangle = \langle h_{zd}(a, b, c) \rangle$. Any estimate for $\langle h_{zd} \rangle$ with a dependency on $\langle h_{zd}(a, b, c) \rangle$ in a prior art azimuth formula is novel and useful.

In practice, the sign ambiguity in equation (4.10a) can be resolved by evaluating the sign in advance given a well plan, a magnetic dip, and theoretical values for ideal measurements in the device coordinate system. Those skilled in the art would be able to accomplish this task.

An important application for equation (4.10a) is horizontal drilling. In this case, the plus sign is used in (4.10a) when the tangent vector to the well has a component in the northern direction and the minus sign is used when the tangent vector to the well has a component in the southern direction. Because sensor offsets tend to be stable over time, a sensor offset can be determined in favorable conditions, stored in memory, and recalled as needed. For example, a horizontal section of a well drilled in the east-west direction could have a sign ambiguity problem. However, a value for $\Delta h_z$ can be evaluated using equation (4.11) when the well is not horizontal or on an east-west heading. Once the axial magnetic offset is known, a driller can use the conditions $\langle g_{zm} \rangle = 0$ and $\langle h_{zm} \rangle - \Delta h_z = 0$ to establish and maintain a horizontal trajectory on an east-west heading.

This invention can be practiced with any means for averaging, aggregating, or combining a sequence of axial gravity or magnetic measurements. The preferred practice for evaluating $\langle h_{zm} \rangle$ or $\langle g_{zm} \rangle$ is to use the same tapered window function specified for estimating transverse sensor offsets.

Figure 5:
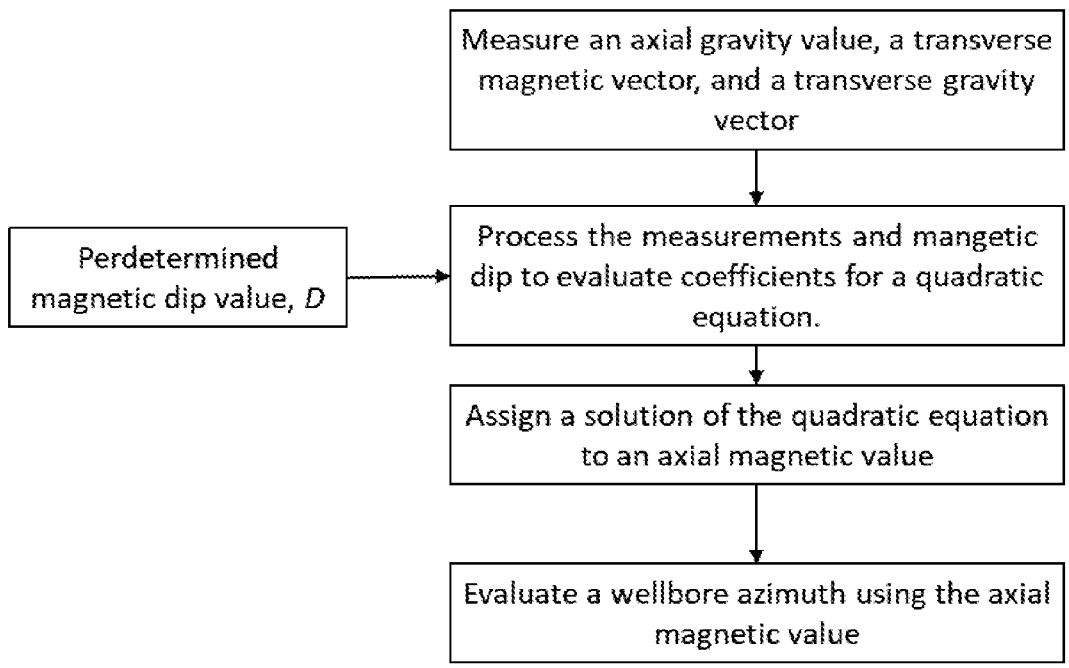
FIG. 5 is a flowchart showing steps in evaluating an azimuth measurement based on a measured axial gravity value, a measured transverse magnetic vector, a measured transverse gravity vector using a quadratic equation and a predetermined magnetic dip angle.

FIG. 5 depicts steps in evaluating an azimuth measurement based on a measured axial gravity value, a measured transverse magnetic vector, a measured transverse gravity vector using a quadratic equation and a predetermined magnetic dip angle. In the first step, one or more measurements of: an axial gravity value, a transverse magnetic vector, and a transverse gravity vector are acquired. The measurements and a prescribed magnetic dip value are processed to evaluate coefficients for a quadratic equation. A solution to the quadratic equation is then assigned to an axial magnetic field value. An azimuth is evaluated using the axial magnetic field value. Though it is not preferred for practicing this invention, an axial magnetic value evaluated according the quadratic equation can be used in prior art formulas for evaluating an azimuth.

5 Transverse Field Correlations and Enhanced Noise Rejection

Correlation-based techniques can be applied to evaluate an averaged transverse field magnitude or an averaged transverse product magnitude when the sensor is rotating. These techniques are especially useful when time-dependent errors on the transverse magnetic measurements are severe or the sensor rotation is very irregular.

One challenge applying a correlation method to measurements acquired by a sensor affixed to a rotating drill string is that the rate of rotation typically varies over a processing window. The problem is that a correlation depends on both a transverse magnitude and a sensor rotation coherence over the processing window. The prior art does not enable determining either variable from a correlation when the two variables are conflated in this fashion.

A novel and useful feature of this invention is that the sensor rotation coherence is evaluated using a first correlation, the first correlation depending upon the sensor rotation coherence but not a transverse magnitude.

A second correlation depending on a transverse magnitude (or transverse product magnitude) and the sensor rotation coherence is also evaluated. An estimate of the magnitude independent of the sensor rotation coherence is then evaluated. For the purpose of this invention, perfectly coherent sensor rotation over a processing window would mean the sensor rotated at a constant rate over the processing window. For a less coherent sensor rotation, the rate of rotation varies over the processing window.

Complex variables are used for convenience here. Consider a complex-valued variable $u=u'+iu''=|u|\exp(i\phi_u)$. Its real part is $u'$, its imaginary part is $u''$, its magnitude is $|u|=\sqrt{u'u'+u''u''}$, its phase is $\phi_u=\text{a tan }2(u'', u')$, and the imaginary number is $i=\sqrt{-1}$. A complex conjugate of $u$ is $u^*=u'-iu''$. The imaginary part of a real-valued variable is identically zero. A complex-valued sequence is a sequence of complex variables.

Complex variables are applicable to this problem because a transverse vector can be expressed as a complex variable. For example, measurement of a transverse magnetic vector $\bar{h}_{Tm}$ can be expressed as the complex variable $h_{xm}+ih_{ym}$, and a measurement of a transverse gravity vector $g_{Tm}$ can be expressed as the complex variable $g_{xm}+ig_{ym}$.

Now consider two complex-valued sequences $u(j)$ and $v(j)$, $j=0, \ldots, N-1$. In general, their correlation is a complex-valued sequence, $r(l)$, $l=-N, \ldots, N-1$, and it is defined by the equation $$r(l) = R(u, v) = \sum_{j=0}^{N-1} u(j)v^*(j+l). \tag{5.1}$$

The correlation may be referred to as a correlation of u and v or a correlation between u and v. The variable l is referred to as a correlation lag. A full energy of a correlation is defined by $$EF(r) = \sum_{j=-N}^{N-1} r(j)r^*(j). \tag{5.2a}$$

An energy of a correlation is a combination of terms $r(j)r^*(j)$ in equation (5.2a) wherein some terms may be omitted or enter into the sum as a reduced weight, others may be weighted heavily, or is otherwise representative of an average, an aggregation, or combination of $r(j)r^*(j)$ values. An energy of a correlation, r will be represented by the symbol $E(r)$. The full energy of the correlation is a special case where the energy is evaluated according to equation (5.2a) or using another numerical method that gives substantially the same result as (5.2a).

In a preferred embodiment for practicing this invention, $N=4096$ and the sensor rotation coherence is represented by a correlation $r_0(l)$ defined by substituting $u(j)=h_{xm}(j)+ih_{ym}(j)$ and $v(j)=1/u^*(j)$ into (5.1). Specifically, $$r_0(l) = \tag{5.3a}$$
$$R(h_{xm}+ih_{ym}, (h_{xm}-ih_{ym})^{-1}) = \sum_{j=0}^{N-1} \exp(i\phi_u(j))\exp(-i\phi_u(j+l)).$$

where $h_{xm}(j)$ and $h_{ym}(j)$ are sequences comprising N samples of transverse magnetic vector measurements defined in (4.1), preferably with sensor offsets subtracted. The correlation $r_0(l)$ has no dependence on a magnitude of a transverse vector; so, an energy of this correlation, $E(r_0)$, also depends only on the sensor rotation coherence and not a transverse magnitude. This is important because energies of other relevant correlations have the same sensor rotation coherence dependence but also a transverse magnitude or a transverse product magnitude dependence.

Persons of ordinary skill in the art will appreciate that an expression analogous to equation (5.3a) could be based on $\bar{g}_T$, but it would ordinarily be less reliable because of shock and vibration effects. A preferred embodiment of this invention is to use (5.3a) instead of:

$$r_0(l)=R(g_{xm}+ig_{ym}, (g_{xm}-ig_{ym})^{-1}). \tag{5.3b}$$

The invention is practicable with either realization of $r_0(l)$.
Now consider the correlation, $$r_1(l) = \tag{5.4}$$
$$R(h_{xm}+ih_{ym}, h_{xm}+ih_{ym}) = \langle h_{Td} \rangle^2 \sum_{j=0}^{N-1} \exp(i\phi_u(j))\exp(-i\phi_u(j+l)).$$

It follows that, $$\langle h_{Td} \rangle = (E(r_1)/E(r_0))^{1/4}. \tag{5.5}$$

In this equation, a sensor rotation coherence is used to remove a dependence of a correlation on the sensor rotation coherence, and the result is a magnitude of a transverse vector that can be used for evaluating an inclination or azimuth. Likewise, a value for $\langle g_{Td} \rangle$ can be evaluated based upon:

$$r_2(l)=R(g_{xm}+ig_{ym}, g_{xm}+ig_{ym}), \text{ and} \tag{5.6}$$

$$\langle g_{Td} \rangle = (E(r_2)/E(r_0))^{1/4}. \tag{5.7}$$

In a preferred embodiment of practicing this invention, the transverse gravity magnitude is evaluated using an averaged transverse product magnitude evaluated based upon the correlation:

$$r_3(l)=R(g_{xm}+ig_{ym}, h_{xm}+ih_{ym}), \text{ from which it follows that} \tag{5.8}$$

$$\langle g_{Td} h_{Td} \rangle = (E(r_3)/E(r_0))^{1/2}, \text{ and} \tag{5.9}$$

$$\langle g_{Td} \rangle = E(r_3)^{1/2}/(E(r_1)E(r_0))^{1/4}. \tag{5.10}$$

In a preferred embodiment for using correlation-based embodiments of this invention, quantities proportional to an energy of each correlation are evaluated using a Fast Fourier Transform (FFT) and Parseval's theorem. Persons of ordinary skill in the art will understand how to evaluate a correlation using a FFT. For the purpose of this invention, applying Parseval's theorem is superior to evaluating an energy of a correlation directly. Further, according to the invention, the length of the FFT is preferably at least 2N because the FFT should be at least as long as the correlation sequence being evaluated to avoid aliasing in the frequency domain. Let $F(u)$, $F(v)$, and $F(r)=F(R(u, v))$ respectively denote the FFT of sequences u, v, and r. The FFT of each sequence is a sequence indexed in the frequency domain. These sequences are related by $F(r)=F(u)F^*(v)$. According to Parseval's theorem the sum of the squares of the magnitudes of the members of a sequence and its Fourier transform (including a Fourier transform evaluated using a FFT method) are proportional. So, calculations for evaluating a transverse field magnitude using a correlation are more efficiently done using Fourier transforms.

Equations (5.4) and (5.6) are referred to as auto-correlations because the same sequence is correlated against itself. Equation (5.8) is referred to as a cross-correlation. Given these definitions, a cross-correlation is useful for determining an averaged transverse product magnitude, and an auto-correlation is useful for determining a averaged transverse magnitude.

Alternatively, one component of a sequence of transverse vectors can be synthesized using the other component of the sequence of transverse vectors by means of, a Hilbert transform. While not a preferred embodiment for practicing the invention, but it has the potential to be useful in any embodiment of the invention when a component of a transverse vector is unfit for use. For the purpose of this invention, a synthesized component of a transverse vector is a measurement of that component of the vector.

Persons of ordinary skill in the art will appreciate that several alternative embodiments are available given the above disclosure. For example, results obtained using a convolution instead of a correlation trivially differ because their total energy is the same. A one-sided correlation could be done where only positive or negative correlation lags are used, but this reduces the amount of noise cancellation. Any filtering or data windowing operation can be performed on the input data sequences or their Fourier transforms.

Instead of evaluating correlations for complex-valued sequences, the method can be applied to real-valued sequences by assigning a value of zero to the imaginary part of u and v, and assigning one of the four transverse field variables, $h_{xm}$, $h_{ym}$, $g_{xm}$, $g_{ym}$ to the real part of u, and one of same four transverse field variables to the real part of v. Real-valued auto-correlations are less effective for removing time-dependent than real-valued cross-correlations; so, improved performance will not result from correlating a real-valued variable against itself. Nonetheless, this invention can be practiced using any two of the four transverse field variables in a correlation.

Samples may sometimes be advantageously omitted from a correlation. One example is when an accelerometer is saturated. Such omissions are best done by assigning a value of zero to any an omitted sample in all correlations over the processing window. This includes correlations determining a sensor rotation coherence.

Figure 6:
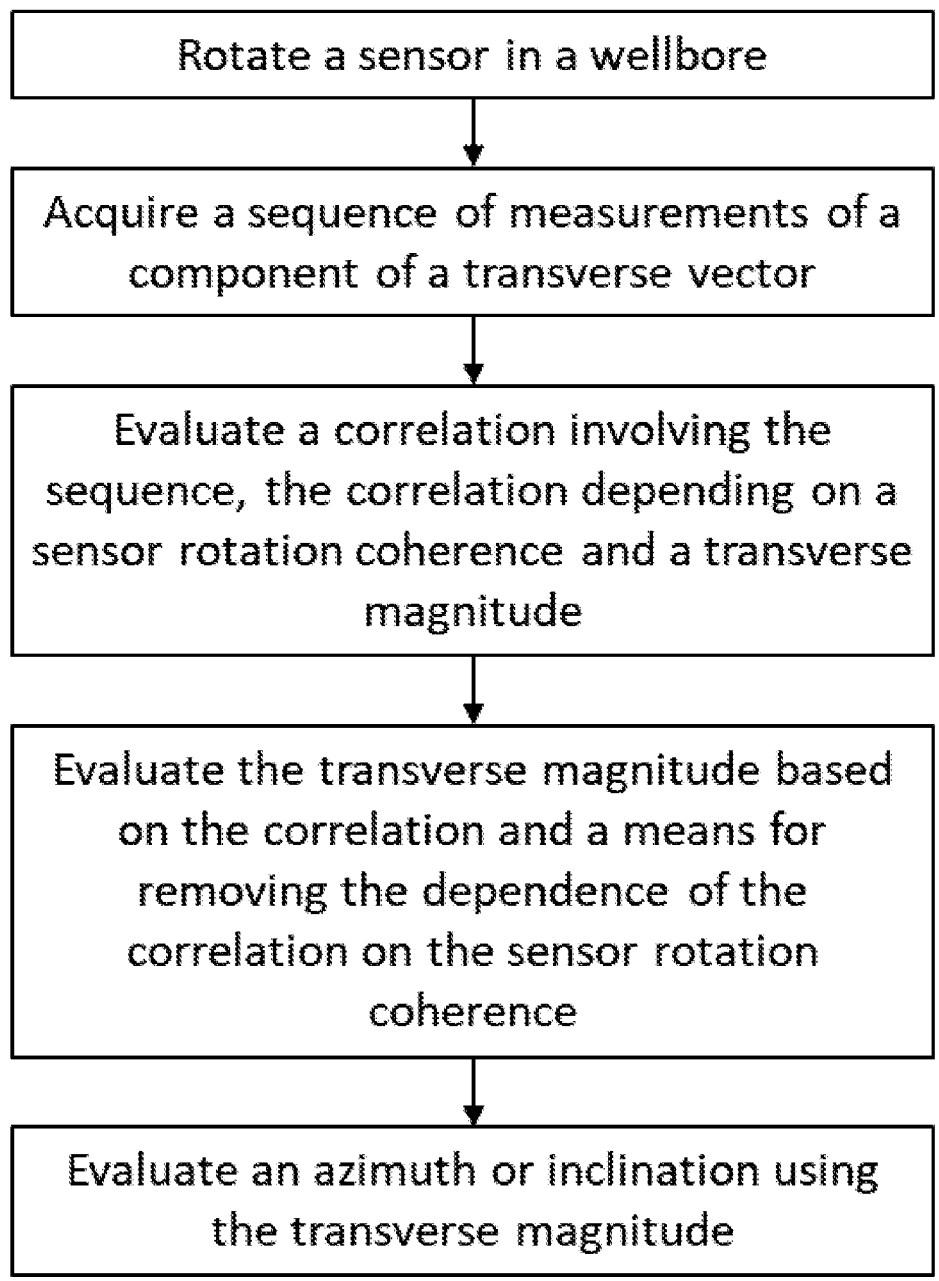
FIG. 6 is a flow chart of a method for evaluating an azimuth or inclination using a correlation wherein a sensor rotation coherence dependence is removed from the correlation to determine a transverse magnitude, the transverse magnitude used in evaluating the azimuth or inclination.

FIG. 6 depicts a method for evaluating an azimuth or inclination using a correlation wherein a sensor rotation coherence dependence is removed from the correlation to determine a transverse magnitude, the transverse magnitude used in evaluating the azimuth or inclination. As specified, a sensor is rotated in a wellbore. The sensor acquires a sequence of measurements of a component of a transverse vector. A correlation involving the sequence is evaluated. The correlation depends on both a transverse magnitude and a sensor rotation coherence. The dependence of the correlation on the sensor rotation coherence is removed. What remains is a transverse magnitude that is an averaged transverse magnitude. The averaged transverse magnitude is used an inclination or azimuth calculation.

7 Formulas for Inclination, Azimuth, and g Using an Averaged Transverse Product Magnitude or a Sensor Rotation Coherence.

In the practice of this invention, one or more of the formulas listed here may be evaluated by processor 15 or any other processor based on sensor signals from magnetometer 11 and accelerometer 12 using instructions stored on non-transitory computer-readable medium 14 or any other non-transitory computer-readable medium.

$$g = \langle h_{Td} \rangle^{-1} \sqrt{\langle g_{zd} \rangle^2 \langle h_{Td} \rangle^2 + \langle g_{Td} h_{Td} \rangle^2}, \tag{7.1a}$$

$$\theta = a\tan 2(\langle g_{Td} h_{Td} \rangle / \langle h_{Td} \rangle, \langle g_{zd} \rangle) = a\tan 2(\langle g_{Td} h_{Td} \rangle / \sqrt{h^2 - \langle h_{zd} \rangle_2}, \langle g_{zd} \rangle), \tag{7.1b}$$

$$\theta = a\cos(\langle g_{zd} \rangle \langle h_{Td} \rangle / \sqrt{\langle g_{zd} \rangle^2 \langle h_{Td} \rangle^2 + \langle g_{Td} h_{Td} \rangle^2}) \tag{7.1c}$$

$$\theta = a\sin(\langle g_{Td} h_{Td} \rangle / \sqrt{\langle g_{zd} \rangle^2 \langle h_{Td} \rangle^2 + \langle g_{Td} h_{Td} \rangle^2}). \tag{7.1d}$$

$$\begin{bmatrix} S_a \\ C_a \end{bmatrix} = \begin{bmatrix} \langle \overline{g}_{Td} \times \overline{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd} \rangle \langle g_{Td} h_{Td} \rangle^2 - \langle g_{zd} \rangle \langle \overline{g}_{Td} \cdot \overline{h}_{Td} \rangle \langle h_{Td} \rangle^2 \end{bmatrix}, \tag{7.2a}$$

$$\gamma = a\tan 2(S_a, C_a). \tag{7.2b}$$

$$g = \sqrt{\langle g_{zd} \rangle^2 + E(r_2)/E(r_0))^{0.5}}, \tag{7.3a}$$

$$\theta = a\tan 2((E(r_2)/E(r_0))^{0.25}, \langle g_{zd} \rangle), \tag{7.3b}$$

$$\theta = a\cos(\langle g_{zd} \rangle E(r_0)^{0.25} / \sqrt{\langle g_{zd} \rangle^2 + E(r_2)^{0.5}}), \tag{7.3c}$$

$$\theta = a\sin(E(r_2)^{0.25} / \sqrt{\langle g_{zd} \rangle^2 + E(r_0)^{0.5} + E(r_2)^{0.5}}). \tag{7.3d}$$

$$\begin{bmatrix} S_a \\ C_a \end{bmatrix} = \begin{bmatrix} \langle \overline{g}_{Td} \times \overline{h}_{Td} \rangle \sqrt{\langle g_{zd} \rangle^2 (E(r_2)/E(r_0))^{0.5}} \\ \langle h_{zd} \rangle (E(r_2)/E(r_0))^{0.5} - \langle g_{zd} \rangle \langle \overline{g}_{Td} \cdot \overline{h}_{Td} \rangle \end{bmatrix}, \tag{7.4a}$$

$$\gamma = a\tan 2(S_a, C_a). \tag{7.4b}$$

None of the above formulas or any equivalent have been used in the prior art for evaluating an inclination or azimuth. A distinguishing feature of these equations is the use of: 1) an averaged transverse product magnitude; or, 2) an averaged transverse magnitude evaluated using an energy of a correlation without a sensor rotation coherence dependence.

Figure 7:
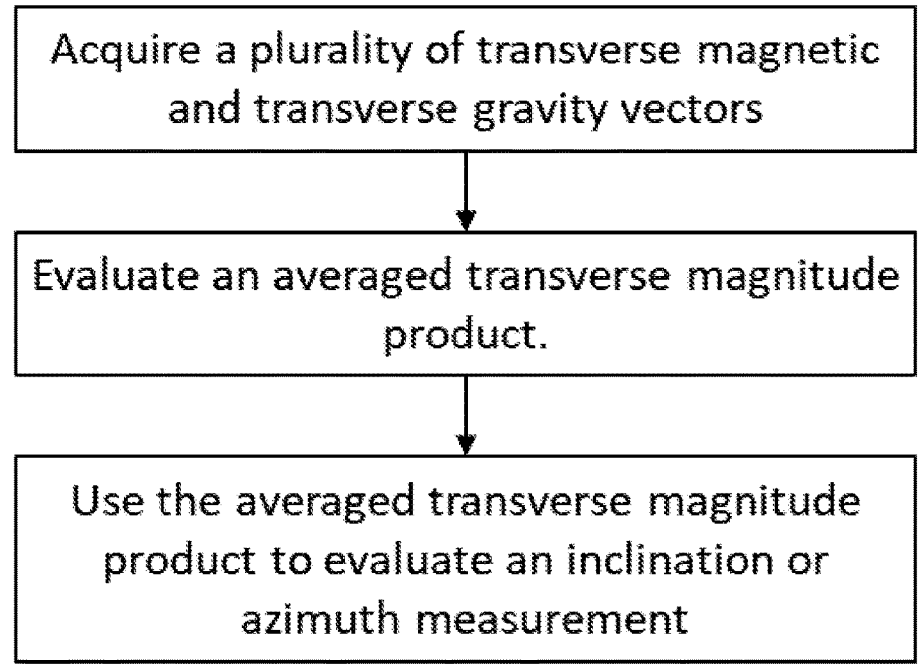
FIG. 7 is a schematic of a method for determining an inclination or azimuth measurement using an averaged transverse product magnitude.

FIG. 7 depicts a method for determining an inclination or azimuth measurement using an averaged transverse and product magnitude. The averaged transverse product magnitude is evaluated based on a plurality of transverse magnetic vectors and transverse gravity vectors.

While not a preferred embodiment for practicing this invention, the above formulas (7.1a-7.4b) are applicable without either axial measurement. In these embodiments, an averaged transverse gravity magnitude is expressed in terms of an averaged transverse product magnitude and an averaged transverse magnetic magnitude. An axial gravity value based on the averaged transverse product magnitude, a prescribed gravity magnitude, and the averaged transverse magnetic magnitude is evaluated and used in any of the above formulas. An axial magnetic value can be evaluated according to a quadratic equation if a magnetic dip is prescribed or based on the averaged transverse magnetic magnitude and a prescribed magnetic field magnitude. An axial magnetic value determined in this fashion can be used in any of the above formulas.

Though an object of this invention is to achieve accurate results without using an adaptive filter or a nonlinear inversion, this invention can be used advantageously to improve the performance of such prior art. Persons of ordinary skill in the art will understand that any formula relating measurements to an inclination, azimuth, or field magnitude including the above formulas could be applied directly to a method such as the method described in U.S. Pat. No. 9,804,288 to redefine equations of state and state variables. Superior performance is provided according to the invention over the prior art because the equations of state would be recast in variables having narrower error distributions. In the case of an adaptive filter, results would be much less sensitive to statistical assumptions about the error distributions associated with the measurements.

8 Two-Stage Sampling of Sensor Signals with Prior Art Calibration

The prior art indicates that filter delays contribute to errors between the phase of the transverse gravity and transverse magnetic measurements acquired by sensors affixed to a rotation drill string. FIG. 5 in U.S. Pat. No. 9,273,547 shows data with errors ascribed to, at least in part, this effect. A specific source of such phase errors not mentioned in the '547 patent or elsewhere is the fact that the errors on the gravity measurements, largely due to shock and vibration, typically have a wider bandwidth and are larger in magnitude, than the errors on the magnetic measurements.

A person of ordinary skill in the art will understand that an analog low-pass filter (LPF) is required to avoid aliasing when sampling an analog signal such as a signal from an accelerometer or magnetometer. It is especially challenging to build such a filter for a typical system that operates at a nominal sample rate suitable for a dynamic wellbore surveying system, roughly 100 Hz. As pointed out in U.S. Pat. No. 9,273,547, a practical filter satisfying these requirements will produce data with errors due to a frequency-dependent filter delay.

Figure 8:
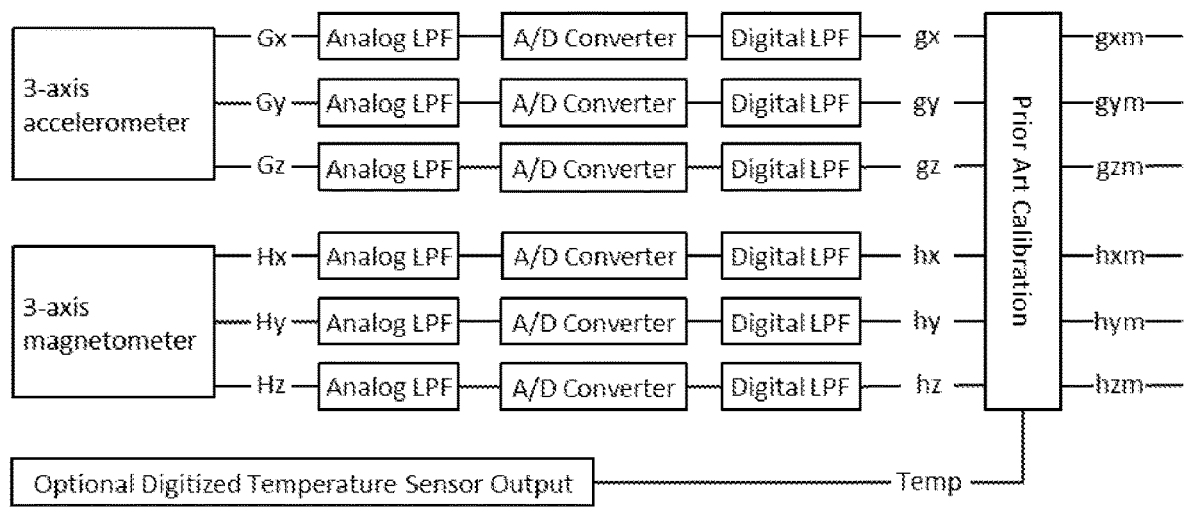
FIG. 8 is a system-level schematic illustrating two-stage sampling in a preferred embodiment of the invention.

In a preferred embodiment of practicing the present invention, a two-stage sampling system is applied to signals from the gravity and magnetic sensors. In a first stage, data are sampled at a rate several fold higher than is required for a typical drilling application. In a second stage, a digital LPF preferably having a finite impulse response (FIR) is applied and the data are down-sampled to a lower rate of 100 Hz. FIG. 8 is a schematic illustrating a suitable system architecture.

Figure 9:
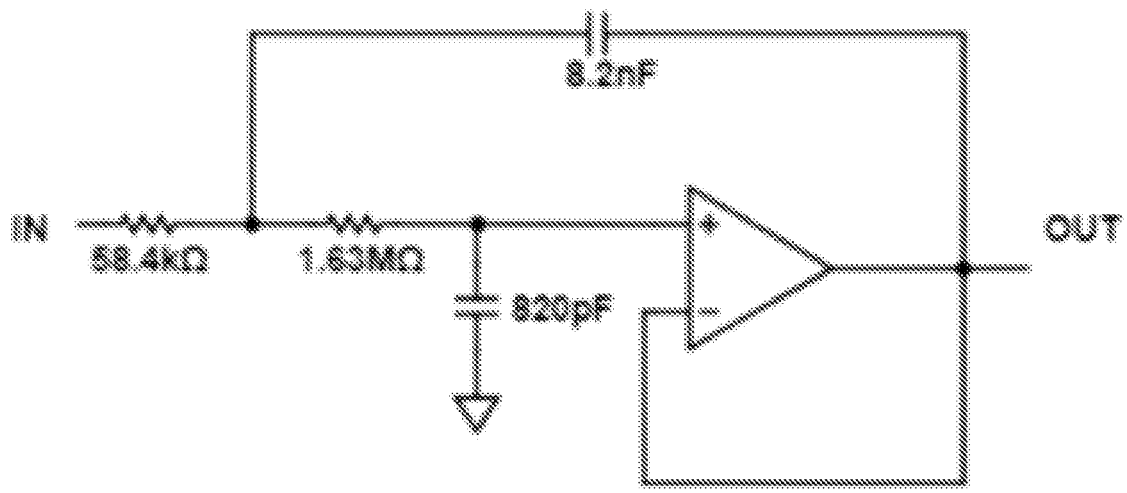
FIG. 9 illustrates an Analog LPF for use in two-stage sampling according to a preferred embodiment of the invention.
Figure 10:
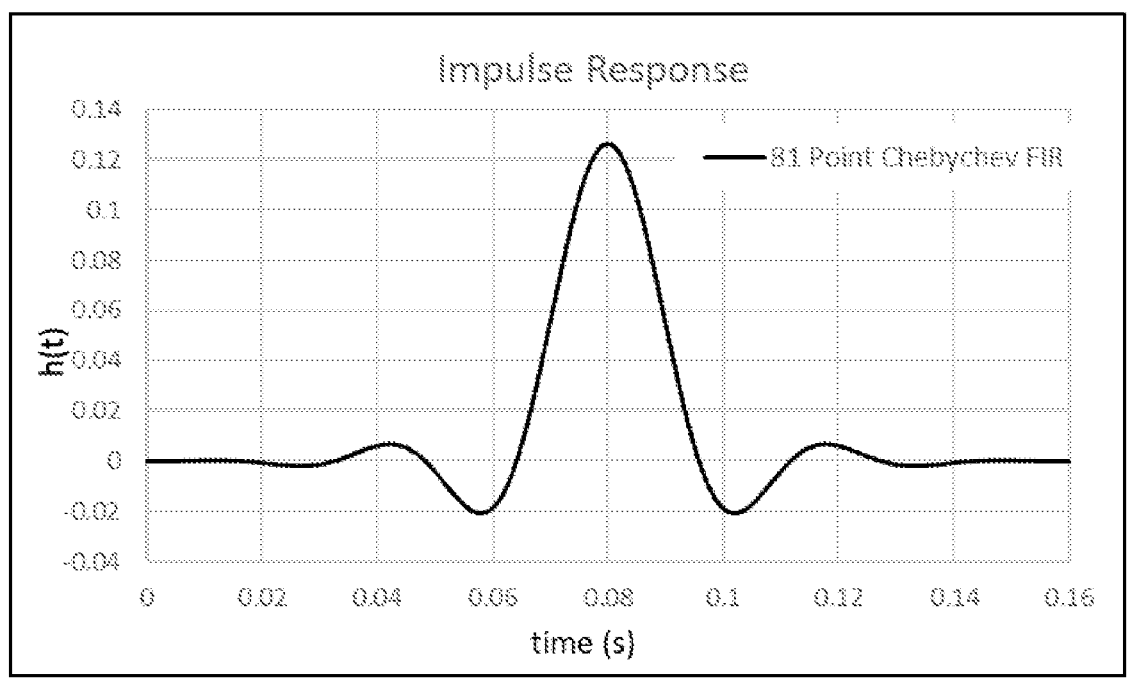
FIG. 10 is a plot of an impulse response for digital LPF filter used in two-stage sampling in a preferred embodiment of the invention.

Operating the first stage at a sample rate of approximately 500 Hz, significantly relaxes the requirements on the analog filter. System performance is improved by adding a second stage to digitally filter the data. A preferred analog filter is shown in FIG. 9. After passing through the analog filter, the signal is digitized with an analog-to-digital convertor. Then the digital filtering stage is done, preferably with downsampling. The impulse response of a preferred digital LPF is shown in FIG. 10, and the coefficients defining the impulse response are listed in FIG. 11.

For a signal digitized at a sample rate of 500 Hz with samples sought at a sample rate of 100 Hz, the digital LPF need only be applied to every fifth point. This can be accomplished by convolving the impulse response with an output from an A/D converter, the filter centered on every fifth digitized sample. In an alternative implementation, a Fourier transform of the input data is evaluated and multiplied by the Fourier transform of the filter coefficients, the inverse Fourier transform is evaluated, and every fifth sample of the resulting sequence is retained. The downsampled data are then calibrated. One skilled in the art would be able to implement this technique based upon the above specification.

In a preferred embodiment for practicing this invention, the three accelerometer channels and the three magnetometer channels are sampled at substantially the same time. For the purpose of the two-stage sampling system operating at an initial sample rate of 500 Hz, the six channels are preferably sampled within 50 micro-seconds. A "mirror image" sample sequencing procedure such as described in U.S. Pat. No. 4,894,923 can be used to mitigate effects of timing errors in systems unable to sample all channels at substantially the same time.

This embodiment of the present invention is practicable if a calibration is applied directly to the output of the A/D convertor. However, this is not a preferred embodiment for practicing the invention because many unnecessary calculations are required to calibrate the data before applying the LPF given that it is advantageous to sample the LPF output at a lower rate than the A/D convertor output. However, this embodiment is nevertheless particularly important to calibrate data from two different sensors before a combination of the data from the two sensors is combined. This is especially true when one sensor is a transverse magnetic sensor and the other is a transverse gravity sensor.

Persons of ordinary skill in the art will be aware of multi-channel A/D converters that can be used, and they will appreciate that an individual A/D converter for each channel is not strictly necessary. Many A/D converters can operate at a frequency much higher than needed for this application. For this reason, it is also possible to multiplex the six measurement channels, use a single-channel A/D converter, demultiplex the digitized result, and then apply the digital LPF and calibration.

The sampling technique specified here includes applying a prior art calibration to the digitized sensor signals. Prior art calibration techniques correct for sensor gain and offset variations, temperature drift, and typically incorporate measured calibration data acquired at a shop or the wellsite prior to placing the device in a wellbore. After calibration, additional processing to remove residual sensor offsets, reduce errors due to sensor misalignment, and noise (time-dependent errors) from the data may be applied prior to evaluating an inclination or azimuth.

A person of ordinary skill in the art will understand that uncalibrated measurements are, in general, not suited for combining with each other. For example, a dot or cross product between a transverse magnetic and transverse gravity vector would be evaluated using calibrated data. A combination of measurements to evaluate an inclination or azimuth would be done using calibrated data.

Figure 12:
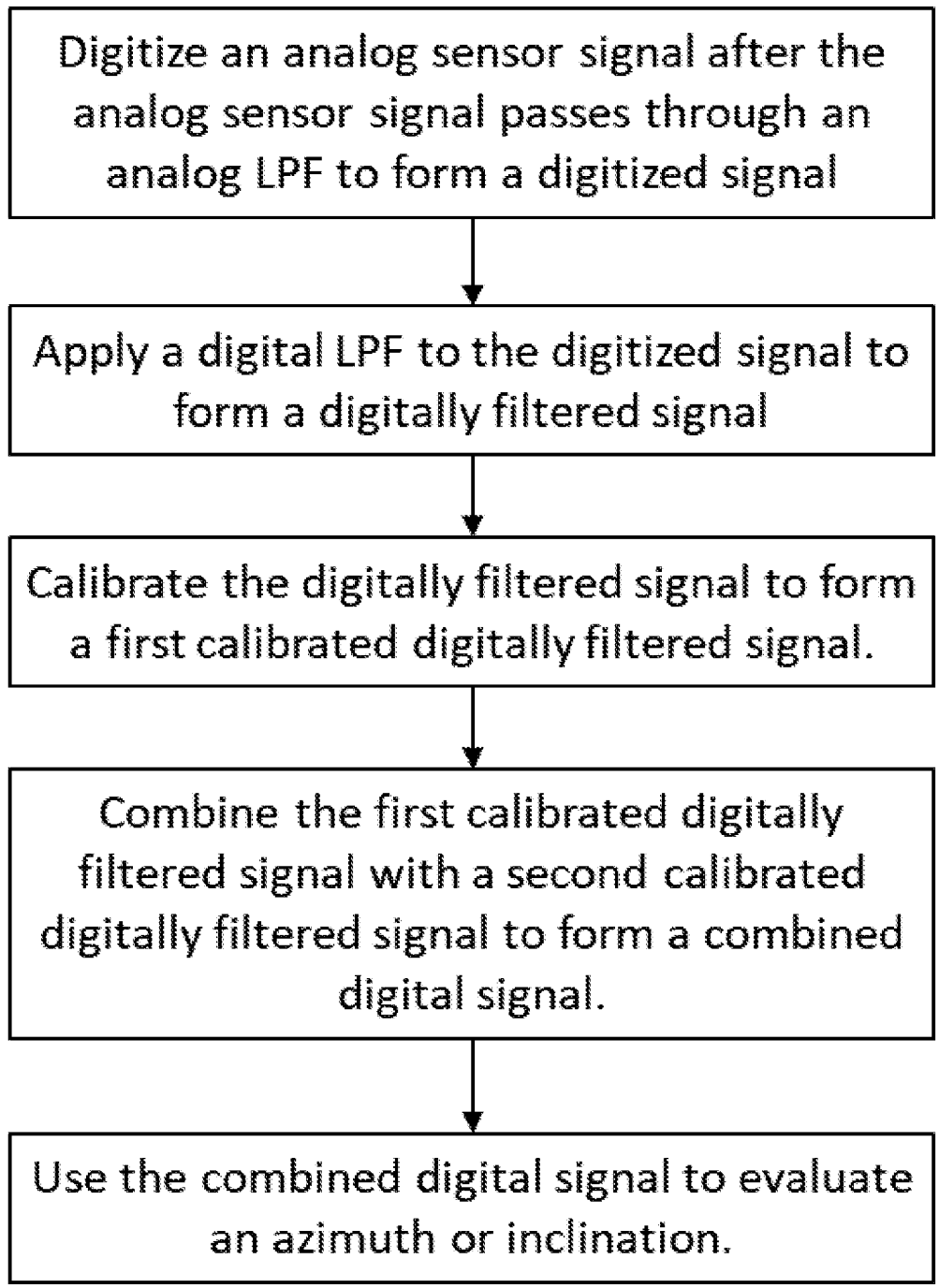
FIG. 12 is a flow chart depicting a general embodiment of a system for applying the two-stage sampling method including a prior art calibration.

FIG. 12 depicts an embodiment of a system for applying the two-stage sampling system of the invention including a calibration and advantageous use of the system to combine two calibrated digitally filtered signals for determining an inclination or azimuth. An analog sensor signal passes through an analog LPF and is digitized to form a digitized signal. A digital LPF is applied to the digitized signal to form a digitally filtered signal. The digitally filtered signal is calibrated to form a first calibrated digitally filtered signal. The first calibrated digitally filtered signal is combined with a second calibrated digitally filtered signal to form a combined digital signal. The combined digital signal is then used to evaluate an inclination or azimuth.

In a preferred embodiment for practicing this invention, the six analog signals from sensors 11 and 12 are transformed into six calibrated digitally filtered signals sampled at a rate of 100 Hz. The calibrated digitally filtered signals form a measured values that are combined according to this specification. In general, the calibration can be applied before or after the digital filter, but it is most advantageously applied after the digital filter.

The description of the different illustrative embodiments has been presented for purposes of illustration and description and the invention is not intended to be exhaustive or limited to the embodiments in the form disclosed. Many modifications and variations will be apparent to persons of ordinary skill in the art. Further, different illustrative embodiments may provide different features as compared to other desirable embodiments. The embodiments selected are chosen and described in order to best explain the principles of the invention and the practical applications of the invention, and to enable persons of ordinary skill in the art to understand the invention and various embodiments of it and various modifications of it as are suited to the particular use contemplated.

I claim:

1. A non-transitory computer-readable medium associated with a processor connected to a drilling apparatus when in use in a subterranean well during drilling of a wellbore, said medium storing one or more instructions that, when executed by said processor during said drilling, cause the processor to use an averaged transverse product magnitude based on signals measured by a gravity sensor and a magnetic sensor in said wellbore for evaluating one or more of the group: i) an inclination, and ii) an azimuth, which causes said drilling apparatus to use said inclination and/or azimuth to adjust during said drilling one or more of the group: i) a position of the wellbore, ii) a drilling direction of the wellbore, iii) a curvature of the wellbore, iv) a drilling speed, v) a drilling fluid circulation rate, vi) a well path.

2. The non-transitory computer-readable medium of claim 1 further comprising instructions that, when executed by the processor, cause the processor to evaluate the inclination or the azimuth using one or more of the group: i) one or more axial gravity values measured by the gravity sensor in the wellbore; or ii) one or more axial magnetic values measured by the magnetic sensor in the wellbore.

3. The non-transitory computer-readable medium of claim 1 further comprising instructions that, when executed by the processor, cause the processor to evaluate an offset based on sensor signals acquired while the magnetic sensor and the gravity sensor are rotating according to one or more of the equations:

i. $\langle \bar{g}_{Tm} \rangle = \Sigma_k w(k) \bar{g}_{Tm}(k) = \Delta \bar{g}_{Tm}$;

ii. $\langle \bar{h}_{Tm} \rangle = \Sigma_k w(k) \bar{h}_{Tm}(k) = \Delta \bar{h}_{Tm}$;

wherein w(k) represents a tapered window function; $\langle \bar{g}_{Tm} \rangle$ represents an averaged transverse gravity vector; $\langle \bar{h}_{Tm} \rangle$ represents an averaged transverse magnetic vector; $\bar{g}_{Tm}(k)$ represents a member of a sequence of transverse gravity vectors; $\bar{h}_{Tm}(k)$ represents a member of a sequence of transverse magnetic vectors; k represents an index of summation; $\Delta \bar{g}_{Tm}$ represents the offset; and, $\Delta \bar{h}_{Tm}$ represents the offset.

4. The non-transitory computer-readable medium of claim 3 wherein the tapered window function is selected from the group: a Blackman window function, a Gaussian window function, a triangular window function, Parzen window function, Welch window function, Hann window function, and Hamming window function.

5. The non-transitory computer-readable medium of claim 1 wherein the signals are measured using a two-stage sampling system.

6. A non-transitory computer-readable medium associated with a processor connected to a drilling apparatus when in use in a subterranean well during drilling of a well bore, said medium storing one or more instructions that, when executed by said processor during said drilling, cause the processor to use an averaged transverse product magnitude based on signals measured by a gravity sensor and a magnetic sensor in said well bore for evaluating one or more of the group: i) an inclination, and ii) an azimuth, which causes said drilling apparatus to use said inclination and/or azimuth to adjust during said drilling one or more of the group: i) a position of the well bore, ii) a drilling direction of the well bore, iii) a curvature of the well bore, iv) a drilling speed, v) a drilling fluid circulation rate, vi) a well path:

wherein the one or more instructions that, when executed by the processor, cause the processor to evaluate the inclination or the azimuth according to one or more of the group:

a. $\theta = a \tan 2(\langle g_{Td} h_{Td} \rangle / \langle h_{Td} \rangle, \langle g_{zd} \rangle)$, b. $\theta = a \cos(\langle g_{zd} \rangle \langle h_{Td} \rangle / \sqrt{\langle g_{zd} \rangle^2 \langle h_{Td} \rangle^2 + \langle g_{Td} h_{Td} \rangle^2})$ c. $\theta = a \sin(\langle g_{Td} h_{Td} \rangle / \sqrt{\langle g_{zd} \rangle^2 \langle h_{Td} \rangle^2 + \langle g_{Td} h_{Td} \rangle^2})$, d. $\begin{bmatrix} S_a \\ C_a \end{bmatrix} = \begin{bmatrix} \langle \bar{g}_{Td} \times \bar{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd} \rangle \langle g_{Td} h_{Td} \rangle^2 - \langle g_{zd} \rangle \langle \bar{g}_{Td} \cdot \bar{h}_{Td} \rangle \langle h_{Td} \rangle^2 \end{bmatrix}$, e. $\begin{bmatrix} S_a \\ C_a \end{bmatrix} = \begin{bmatrix} \langle \bar{g}_{Td} \times \bar{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd}(a, b, c) \rangle \langle g_{Td} h_{Td} \rangle^2 - \langle g_{zd} \rangle \langle \bar{g}_{Td} \cdot \bar{h}_{Td} \rangle \langle h_{Td} \rangle^2 \end{bmatrix}$ f. $\gamma = a \tan 2(S_a, C_a)$, wherein $\theta$ represents the inclination; a tan 2 is an arctangent function; $\langle g_{Td} h_{Td} \rangle$ represents the averaged transverse product magnitude; $\langle h_{Td} \rangle$ represents an averaged transverse magnetic field magnitude; $\langle g_{zd} \rangle$ represents an averaged axial gravity measurement; a cos represents an arc cosine function; a sin represents an arc sine function; $S_a$ represents a sine of the azimuth; $C_a$ represents a cosine of the azimuth; $\langle \bar{g}_{Td} \times \bar{h}_{Td} \rangle$ represents an averaged transverse cross product; $\langle \bar{g}_{Td} \times \bar{h}_{Td} \rangle$ represents an averaged transverse dot product; $\langle h_{zd} \rangle$ represents an averaged axial magnetic measurement; $\langle h_{zd}(a,b,c) \rangle$ represents an axial magnetic field value based on an axial gravity measurement, a transverse gravity measurement, a transverse magnetic measurement, and a predetermined magnetic dip angle; and $\gamma$ represents the azimuth.

7. The non-transitory computer-readable medium of claim 6 wherein the averaged transverse product magnitude is evaluated using one or more of the group:
   a. a weighted average using a tapered window function,
   b. a Blackman window function,
   d. a correlation-based technique, and
   e. a selection.

8. The non-transitory computer-readable medium of claim 6 wherein the averaged transverse product magnitude is evaluated using one or more of the group:
   a. a weighted average using a tapered window function,
   b. a Blackman window function,
   c. a correlation-based technique, and
   d. a selection; and
   wherein the inclination or the azimuth are evaluated according to one or more of the group:

$\theta = a \tan 2(\langle g_{Td} h_{Td} \rangle / \langle h_{Td} \rangle, \langle g_{zd} \rangle)$;

$\theta = a \cos(\langle g_{zd} \rangle \langle h_{Td} \rangle / \sqrt{\langle g_{zd} \rangle^2 \langle h_{Td} \rangle^2 + \langle g_{Td} h_{Td} \rangle^2})$;

$\theta = a \sin(\langle g_{Td} h_{Td} \rangle / \sqrt{\langle g_{zd} \rangle^2 \langle h_{Td} \rangle^2 + \langle g_{Td} h_{Td} \rangle^2})$;

$$\begin{bmatrix} S_a \\ C_a \end{bmatrix} = \begin{bmatrix} \langle \overline{g}_{Td} \times \overline{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd} \rangle \langle g_{Td} h_{Td} \rangle^2 - \langle g_{zd} \rangle \langle \overline{g}_{Td} \cdot \overline{h}_{Td} \rangle \langle h_{Td} \rangle^2 \end{bmatrix};$$

$$\begin{bmatrix} S_a \\ C_a \end{bmatrix} = \begin{bmatrix} \langle \overline{g}_{Td} \times \overline{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd}(a,b,c) \rangle \langle g_{Td} h_{Td} \rangle^2 - \langle g_{zd} \rangle \langle \overline{g}_{Td} \cdot \overline{h}_{Td} \rangle \langle h_{Td} \rangle^2 \end{bmatrix};$$

$\gamma = a \tan 2(S_a, C_a);$ wherein θ represents the inclination; a tan 2 is the arctangent function; $\langle g_{Td} h_{Td} \rangle$ represents the averaged transverse product magnitude; $\langle h_{Td} \rangle$ represents the averaged transverse magnetic field magnitude; $\langle g_{zd} \rangle$ represents the averaged axial gravity measurement; a cos represents the arc cosine function; a sin represents the arc sine function; $S_a$ represents the sine of the azimuth; $C_a$ represents the cosine of the azimuth; $\langle \overline{g}_{Td} \times \overline{h}_{Td} \rangle$ represents the averaged transverse cross product; $\langle \overline{g}_{Td} \times \overline{h}_{Td} \rangle$ represents the averaged transverse dot product; $\langle h_z \rangle$ represents the averaged axial magnetic measurement; $\langle h_{zd}(a,b,c) \rangle$ represents the axial magnetic field value based on the axial gravity measurement, the transverse gravity measurement, the transverse magnetic measurement, and the predetermined magnetic dip angle; and y represents the azimuth.

9. A non-transitory computer-readable medium associated with a processor connected to a drilling apparatus when in use in a subterranean well during drilling of a wellbore, said medium storing one or more instructions that, when executed by said processor during said drilling, cause the processor to use an averaged transverse product magnitude based on signals measured by a gravity sensor and a magnetic sensor in said wellbore for evaluating one or more of the group: i) an inclination, and ii) an azimuth, which causes said drilling apparatus to use said inclination and/or azimuth to adjust during said drilling one or more of the group: i) a position of the wellbore, ii) a drilling direction of the wellbore, iii) a curvature of the wellbore, iv) a drilling speed, v) a drilling fluid circulation rate, vi) a well path;

wherein the one or more instructions that, when executed by the processor, cause the processor to evaluate the averaged transverse product magnitude according to one or more of the equations:

a. $\langle g_{Td} h_{Td} \rangle = (E(r_3)/E(r_0))^{1/2}$, and b. $\langle g_{Td} h_{Td} \rangle = \sqrt{\langle \overline{g}_{Td} \cdot \overline{h}_{Td} \rangle^2 + \langle \overline{g}_{Td} \times \overline{h}_{Td} \rangle^2}$;

wherein $\langle g_{Td} h_{Td} \rangle$ represents the averaged transverse product magnitude; $\langle \overline{g}_{Td} \times \overline{h}_{Td} \rangle$ represents an averaged transverse cross product; $\langle \overline{g}_{Td} \cdot \overline{h}_{Td} \rangle$ represents an averaged transverse dot product; $E(r_3)$ represents an energy of a correlation between a transverse gravity vector and a transverse magnetic vector; and, $E(r_0)$ represents an energy of a sensor rotation coherence.

10. The non-transitory computer readable medium of claim 9 wherein the non-transitory computer-readable medium is selected from one or more of the group:

a random-access memory device; a read-only memory device; a flash memory device; a hard drive; a compact disc; a digital versatile disc; a magnetic tape; a network attached storage device; and, a hard drive; and wherein the one or more instructions that, when executed by the processor, cause the processor to evaluate the inclination or the azimuth according to one or more of the group:

a. $\theta = a \tan 2(\langle g_{Td} h_{Td} \rangle / \langle h_{Td} \rangle, \langle g_{zd} \rangle),$ b. $\theta = a \cos(\langle g_{zd} \rangle \langle h_{Td} \rangle / \sqrt{\langle g_{zd} \rangle^2 \langle h_{Td} \rangle^2 + \langle g_{Td} h_{Td} \rangle^2})$ c. $\theta = a \sin(\langle g_{Td} h_{Td} \rangle / \sqrt{\langle g_{zd} \rangle^2 \langle h_{Td} \rangle^2 + \langle g_{Td} h_{Td} \rangle^2}),$ d. $\begin{bmatrix} S_a \\ C_a \end{bmatrix} = \begin{bmatrix} \langle \overline{g}_{Td} \times \overline{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd} \rangle \langle g_{Td} h_{Td} \rangle^2 - \langle g_{zd} \rangle \langle \overline{g}_{Td} \cdot \overline{h}_{Td} \rangle \langle h_{Td} \rangle^2 \end{bmatrix},$ e. $\begin{bmatrix} S_a \\ C_a \end{bmatrix} = \begin{bmatrix} \langle \overline{g}_{Td} \times \overline{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd}(a,b,c) \rangle \langle g_{Td} h_{Td} \rangle^2 - \langle g_{zd} \rangle \langle \overline{g}_{Td} \cdot \overline{h}_{Td} \rangle \langle h_{Td} \rangle^2 \end{bmatrix}$ f. $\gamma = a \tan 2(S_a, C_a),$ wherein θ represents the inclination; a tan 2 is an arctangent function; $\langle \overline{g}_{Td} \times \overline{h}_{Td} \rangle$ represents the averaged transverse product magnitude; $\langle h_{Td} \rangle$ represents an averaged transverse magnetic field magnitude; $\langle g_{zd} \rangle$ represents an averaged axial gravity measurement; a cos represents an arc cosine function; a sin represents an arc sine function; $S_a$ represents a sine of the azimuth; $C_a$ represents a cosine of the azimuth; $\langle \overline{g}_{Td} \times \overline{h}_{Td} \rangle$ represents the averaged transverse cross product; $\langle \overline{g}_{Td} \times \overline{h}_{Td} \rangle$ represents the averaged transverse dot product; $\langle h_{zd} \rangle$ represents an averaged axial magnetic measurement; $\langle h_{zd}(a,b,c) \rangle$ represents an axial magnetic field value based on an axial gravity measurement, a transverse gravity measurement, a transverse magnetic measurement, and a predetermined magnetic dip angle; and γ represents the azimuth.

11. The non-transitory computer-readable medium of claim 9 further comprising instructions that, when executed by the processor, cause the processor to evaluate the averaged transverse product magnitude using the averaged transverse dot product and the averaged transverse cross product; and further comprising instructions that, when executed by the processor, cause the processor to use one or more axial gravity values in determining an axial magnetic value according to the equation:

i. $\langle h_{xd}(a,b,c) \rangle = \dfrac{-b \pm \sqrt{b^2 - 4ac}}{2a},$ wherein ii. $a = \langle g_{Td} h_{Td} \rangle^2 \sin^2(D) / \langle h_{Td} \rangle^2 - \langle g_{zd} \rangle^2 \cos^2(D)$ iii. $b = -2 \langle g_{zd} \rangle \langle \overline{g}_{Td} \cdot \overline{h}_{Td} \rangle$ iv. $c = \langle \overline{g}_{Td} \times \overline{h}_{Td} \rangle^2 + \langle g_{zd} \rangle^2 \langle h_{Td} \rangle^2 \sin^2(D) - \langle g_{Td} h_{Td} \rangle^2 \cos^2(D);$ and wherein $\langle h_{zd}(a,b,c) \rangle$ represents the axial magnetic value; $\langle g_{Td} h_{Td} \rangle$ represents the averaged transverse product magnitude; sin represents a sine function; cos represents a cosine function; D represents a predetermined magnetic dip value; $\langle h_{Td} \rangle$ represents an averaged transverse magnetic field magnitude; $\langle g_{zd} \rangle$ represents an averaged axial gravity measurement; $\langle \overline{g}_{Td} \times$ $\bar{h}_{Td}$) represents the averaged transverse cross product;
and $\langle g_{Td}*h_{Td}\rangle$ represents the averaged transverse dot product.

12. The non-transitory computer-readable medium of claim 11 further comprising instructions that, when executed by the processor, cause the processor to:
   a. evaluate the averaged transverse dot product using a plurality of transverse magnetic vectors and a plurality of transverse gravity vectors measured by the magnetic sensor and the gravity sensor in the wellbore; and
   b. evaluate the averaged transverse cross product using the plurality of transverse magnetic vectors and the plurality of transverse gravity vectors measured by the magnetic sensor and the gravity sensor in the wellbore.

13. The non-transitory computer-readable medium of claim 12 further comprising instructions that, when executed by the processor, cause the processor to:
   a. determine the axial magnetic value using the plurality of transverse magnetic vectors, the plurality of transverse gravity vectors, and the predetermined magnetic dip value; and/or
   b. evaluate the azimuth using the axial magnetic value.

14. The non-transitory computer readable medium of claim 9 wherein the non-transitory computer-readable medium is selected from one or more of the group: a random access memory device; a read-only memory device; a flash memory device; a hard drive; a compact disc; a digital versatile disc; a magnetic tape; a network attached storage device; and, a hard drive; and
   wherein the one or more instructions that, when executed by the processor, cause the processor to evaluate the inclination or the azimuth according to one or more of the group:

$\theta = a \tan 2(\langle g_{Td}h_{Td}\rangle/\langle h_{Td}\rangle, \langle g_{zd}\rangle);$ $\theta = a \cos(\langle g_{zd}\rangle \langle h_{Td}\rangle/\sqrt{\langle g_{zd}\rangle^2 \langle h_{Td}\rangle^2 + \langle g_{Td}h_{Td}\rangle^2});$ $\theta = a \sin(\langle g_{Td}h_{Td}\rangle/\sqrt{\langle g_{zd}\rangle^2 \langle h_{Td}\rangle^2 + \langle g_{Td}h_{Td}\rangle^2});$ d. $\begin{bmatrix} S_a \\ C_a \end{bmatrix} = \begin{bmatrix} \langle \bar{g}_{Td} \times \bar{h}_{Td}\rangle\langle h_{Td}\rangle\sqrt{\langle g_{zd}\rangle^2\langle h_{Td}\rangle^2 + \langle g_{Td}h_{Td}\rangle^2} \\ \langle h_{zd}\rangle\langle g_{Td}h_{Td}\rangle^2 - \langle g_{zd}\rangle\langle \bar{g}_{Td}\cdot\bar{h}_{Td}\rangle\langle h_{Td}\rangle^2 \end{bmatrix},$ e. $\begin{bmatrix} S_a \\ C_a \end{bmatrix} = \begin{bmatrix} \langle \bar{g}_{Td} \times \bar{h}_{Td}\rangle\langle h_{Td}\rangle\sqrt{\langle g_{zd}\rangle^2\langle h_{Td}\rangle^2 + \langle g_{Td}h_{Td}\rangle^2} \\ \langle h_{zd}(a,b,c)\rangle\langle g_{Td}h_{Td}\rangle^2 - \langle g_{zd}\rangle\langle \bar{g}_{Td}\cdot\bar{h}_{Td}\rangle\langle h_{Td}\rangle^2 \end{bmatrix}$ $\gamma = a \tan 2(S_a, C_a);$ wherein $\theta$ represents the inclination; a tan 2 is an arctangent function; $\langle g_{Td}h_{Td}\rangle$ represents the averaged transverse product magnitude; $\langle h_{Td}\rangle$ represents an averaged transverse magnetic field magnitude; $\langle g_{zd}\rangle$ represents an averaged axial gravity measurement; a cos represents an arc cosine function; a sin represents an arc sine function; $S_a$ represents a sine of the azimuth; $C_a$ represents a cosine of the azimuth; $\langle \bar{g}_{Td}\times\bar{h}_{Td}\rangle$ represents the averaged transverse cross product; $\langle \bar{g}_{Td}*\bar{h}_{Td}\rangle$ represents the averaged transverse dot product; $\langle h_{zd}\rangle$ represents an averaged axial magnetic measurement; $\langle h_{zd}(a,b,c)\rangle$ represents an axial magnetic field value based on an axial gravity measurement, a transverse gravity measurement, a transverse magnetic measurement, and a predetermined magnetic dip angle; and $\gamma$ represents the azimuth.

15. The non-transitory computer-readable medium of claim 9 further comprising instructions that, when executed by the processor, cause the processor to evaluate the averaged transverse product magnitude using the averaged transverse dot product and the averaged transverse cross product; and further comprising instructions that, when executed by the processor, cause the processor to use one or more axial gravity values in determining an axial magnetic value according to the equation:

i. $\langle h_{xd}(a,b,c)\rangle = \dfrac{-b \pm \sqrt{b^2 - 4ac}}{2a},$ wherein ii. $a = \langle g_{Td}h_{Td}\rangle^2 \sin^2(D)/\langle h_{Td}\rangle^2 - \langle g_{zd}\rangle^2 \cos^2(D)$ iii. $b = -2\langle g_{zd}\rangle\langle \bar{g}_{Td}\bar{h}_{Td}\rangle$ iv. $c = \langle \bar{g}_{Td}\times\bar{h}_{Td}\rangle^2 + \langle g_{zd}\rangle^2 \langle h_{Td}\rangle^2 \sin^2(D) - \langle g_{Td}h_{Td}\rangle^2 \cos^2(D);$ and wherein $\langle h_{zd}(a,b,c)\rangle$ represents the axial magnetic value; $\langle g_{Td}h_{Td}\rangle$ represents the averaged transverse product magnitude; sin represents a sine function; cos represents a cosine function; D represents a predetermined magnetic dip value; $\langle h_{Td}\rangle$ represents an averaged transverse magnetic field magnitude; $\langle g_{zd}\rangle$ represents an averaged axial gravity measurement; $\langle \bar{g}_{Td}\times\bar{h}_{Td}\rangle$ represents the averaged transverse cross product; and $\langle \bar{g}_{Td}*\bar{h}_{Td}\rangle$ represents the averaged transverse dot product.

16. A non-transitory computer-readable medium associated with a processor connected to a drilling apparatus when in use in a subterranean well during drilling of a well bore, said medium storing one or more instructions that, when executed by said processor during said drilling, cause the processor to use an averaged transverse product magnitude based on signals measured by a gravity sensor and a magnetic sensor in said well bore for evaluating one or more of the group: i) an inclination, and ii) an azimuth, which causes said drilling apparatus to use said inclination and/or azimuth to adjust during said drilling one or more of the group: i) a position of the well bore, ii) a drilling direction of the well bore, iii) a curvature of the well bore, iv) a drilling speed, v) a drilling fluid circulation rate, vi) a well path:
   further comprising instructions that, when executed by the processor, cause the processor to evaluate the averaged transverse product magnitude using an averaged transverse dot product and an averaged transverse cross product:
   further comprising instructions that, when executed by the processor, cause the processor to:
   a. evaluate the averaged transverse dot product using a plurality of transverse magnetic vectors and a plurality of transverse gravity vectors measured by the magnetic sensor and the gravity sensor in the wellbore; and
   b. evaluate the averaged transverse cross product using the plurality of transverse magnetic vectors and the plurality of transverse gravity vectors measured by the magnetic sensor and the gravity sensor in the wellbore:
   further comprising instructions that, when executed by the processor, cause the processor to:

a. determine an axial magnetic value using the plurality of transverse magnetic vectors, the plurality of transverse gravity vectors, and a Predetermined magnetic dip value, and/or
b. evaluate the azimuth using the axial magnetic value; and further comprising instructions that, when executed by the processor, cause the processor to use one or more axial gravity values in determining the axial magnetic value according to the equation:

vii. $\langle h_{zd}(a, b, c) \rangle = \dfrac{-b \pm \sqrt{b^2 - 4ac}}{2a}$, wherein viii. $a = \langle g_{Td} h_{Td} \rangle^2 \sin^2(D) / \langle h_{Td} \rangle^2 - \langle g_{zd} \rangle^2 \cos^2(D)$ ix. $b = -2 \langle g_{zd} \rangle \langle \bar{g}_{Td} \cdot \bar{h}_{Td} \rangle$ x. $c = \langle \bar{g}_{Td} \times \bar{h}_{Td} \rangle^2 + \langle g_{zd} \rangle^2 \langle h_{Td} \rangle^2 \sin^2(D) - \langle g_{Td} h_{Td} \rangle^2 \cos^2(D)$, and wherein $\langle h_{zd}(a,b,c) \rangle$ represents the axial magnetic value; $\langle g_{Td} h_{Td} \rangle$ represents the averaged transverse product magnitude; sin represents a sine function; cos represents a cosine function; D represents the predetermined magnetic dip value; $\langle h_{Td} \rangle$ represents an averaged transverse magnetic field magnitude; $\langle g_{zd} \rangle$ represents an averaged axial gravity measurement; $\langle \bar{g}_{Td} \times \bar{h}_{Td} \rangle$ represents the averaged transverse cross product; and $\langle \bar{g}_{Td} \times \bar{h}_{Td} \rangle$ represents the averaged transverse dot product.

17. A system for wellbore surveying comprising:
a. a processor;
b. a non-transitory computer-readable medium storing one or more instructions that, when executed by the processor, cause the processor to:
  i. evaluate an averaged transverse product magnitude using a sequence of transverse magnetic vectors measured by a magnetic sensor in a wellbore and a sequence of transverse gravity vectors measured by a gravity sensor in the wellbore; and,
  ii. use the average transverse product magnitude to evaluate one or more of the group: i) an inclination, and ii) an azimuth; and
c. a drilling apparatus that uses said inclination and/or azimuth during drilling to adjust one or more of the group: i) a position of the well bore, ii) a drilling direction of the well bore, iii) a curvature of the wellbore, iv) a drilling speed, v) a drilling fluid circulation rate, and vi) a well path.

18. A system for wellbore surveying comprising:
a. a processor;
b. a non-transitory computer-readable medium storing one or more instructions that, when executed by the processor, cause the processor to:
  i. evaluate an averaged transverse product magnitude using a sequence of transverse magnetic vectors measured by a magnetic sensor in a wellbore and a sequence of transverse gravity vectors measured by a gravity sensor in the wellbore; and,
  ii. use the average transverse product magnitude to evaluate one or more of the group: i) an inclination, and ii) an azimuth; and c. a drilling apparatus that uses said inclination and/or azimuth during drilling to adjust one or more of the group: i) a position of the well bore, ii) a drilling direction of the well bore, iii) a curvature of the wellbore, iv) a drilling speed, v) a drilling fluid circulation rate, and vi) a well path;

wherein the averaged transverse product magnitude is evaluated according to one or more of the group:

d. $\langle g_{Td} h_{Td} \rangle = (E(r_3)/E(r_0))^{1/2}$, and e. $\langle g_{Td} h_{Td} \rangle = \sqrt{\langle \bar{g}_{Td} \cdot \bar{h}_{Td} \rangle^2 + \langle \bar{g}_{Td} \times \bar{h}_{Td} \rangle^2}$;

wherein $\langle g_{Td} h_{Td} \rangle$ represents the averaged transverse product magnitude; $\langle \bar{g}_{Td} \times \bar{h}_{Td} \rangle$ represents an averaged transverse cross product; $\langle \bar{g}_{Td} * \bar{h}_{Td} \rangle$ represents an averaged transverse dot product; $E(r_3)$ represents an energy of a correlation between a transverse gravity vector and a transverse magnetic vector; and, $E(r_0)$ represents an energy of a sensor rotation coherence.

19. A system for wellbore surveying comprising:
a. a processor;
b. a non-transitory computer-readable medium storing one or more instructions that,
when executed by the processor, cause the processor to:
  i. evaluate an averaged transverse product magnitude using a sequence of transverse magnetic vectors measured by a magnetic sensor in a wellbore and a sequence of transverse gravity vectors measured by a gravity sensor in the wellbore; and,
  ii. use the average transverse product magnitude to evaluate one or more of the group: i) an inclination, and ii) an azimuth; and
c. a drilling apparatus that uses said inclination and/or azimuth during drilling to adjust one or more of the group: i) a position of the well bore, ii) a drilling direction of the well bore, iii) a curvature of the wellbore, iv) a drilling speed, v) a drilling fluid circulation rate, and vi) a well path;

wherein the inclination or the azimuth are evaluated according to one or more of the group:

$\theta = a\tan 2(\langle g_{Td} h_{Td} \rangle / \langle h_{Td} \rangle, \langle g_{zd} \rangle)$;

$\theta = a\cos(\langle g_{zd} \rangle \langle h_{Td} \rangle / \sqrt{\langle g_{zd} \rangle^2 \langle h_{Td} \rangle^2 + \langle g_{Td} h_{Td} \rangle^2})$;

$\theta = a\sin(\langle g_{Td} h_{Td} \rangle / \sqrt{\langle g_{zd} \rangle^2 \langle h_{Td} \rangle^2 + \langle g_{Td} h_{Td} \rangle^2})$;

$\begin{bmatrix} S_a \\ C_a \end{bmatrix} = \begin{bmatrix} \langle \bar{g}_{Td} \times \bar{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd} \rangle \langle g_{Td} h_{Td} \rangle^2 - \langle g_{zd} \rangle \langle \bar{g}_{Td} \cdot \bar{h}_{Td} \rangle \langle h_{Td} \rangle^2 \end{bmatrix}$;

$\begin{bmatrix} S_a \\ C_a \end{bmatrix} = \begin{bmatrix} \langle \bar{g}_{Td} \times \bar{h}_{Td} \rangle \langle h_{Td} \rangle \sqrt{\langle g_{zd} \rangle^2 \langle h_{Td} \rangle^2 + \langle g_{Td} h_{Td} \rangle^2} \\ \langle h_{zd}(a, b, c) \rangle \langle g_{Td} h_{Td} \rangle^2 - \langle g_{zd} \rangle \langle \bar{g}_{Td} \cdot \bar{h}_{Td} \rangle \langle h_{Td} \rangle^2 \end{bmatrix}$;

$\gamma = a\tan 2(S_a, C_a)$;

wherein $\theta$ represents the inclination; a tan 2 is an arctangent function; $\langle g_{Td} h_{Td} \rangle$ represents the averaged transverse product magnitude; $\langle h_{Td} \rangle$ represents an averaged transverse magnetic field magnitude; $\langle g_{zd} \rangle$ represents an averaged axial gravity measurement; a cos represents an arc cosine function; a sin represents an arc sine function; $S_a$ represents a sine of the azimuth; $C_a$ represents a cosine of the azimuth; $\langle \bar{g}_{Td} \times \bar{h}_{Td} \rangle$ represents an averaged transverse cross product; $\langle \bar{g}_{Td}*\bar{h}_{Td}\rangle$ represents an averaged transverse dot product; $\langle h_{zd}\rangle$ represents an averaged axial magnetic measurement; $\langle h_{zd}(a,b,c)\rangle$ represents an axial magnetic field value based on an axial gravity measurement, a transverse gravity measurement, a transverse magnetic measurement, and a predetermined magnetic dip angle; and γ represents the azimuth.

20. A system for wellbore surveying comprising:
 a. a magnetic sensor in a wellbore;
 b. a gravity sensor in the wellbore;
 c. a means for evaluating an averaged transverse product magnitude using a sequence of transverse magnetic vectors measured by the magnetic sensor and a sequence of transverse gravity vectors measured by the gravity sensor; and,
 d. a means for using the averaged transverse product magnitude to evaluate one or more of the group: i) an inclination, and ii) an azimuth;
 e. a means for using the inclination or azimuth during drilling the well bore to adjust one or more of the group: i) a position of the well bore, ii) a drilling direction of the well bore, iii) a curvature of the well bore, iv) a drilling speed, v) a circulation rate, and vi) a well path.

21. The system of claim 20 wherein the sequence of transverse magnetic vectors and the sequence of transverse magnetic vectors is measured using a two-stage sampling system.

22. A system for wellbore surveying comprising:
 a. a magnetic sensor in a wellbore;
 b. a gravity sensor in the wellbore;
 c. a means for evaluating an averaged transverse product magnitude using a sequence of transverse magnetic vectors measured by the magnetic sensor and a sequence of transverse gravity vectors measured by the gravity sensor; and,
 d. a means for using the averaged transverse product magnitude to evaluate one or more of the group: i) an inclination, and ii) an azimuth;
 e. a means for using the inclination or azimuth during drilling the well bore to adjust one or more of the group: i) a position of the well bore, ii) a drilling direction of the well bore, iii) a curvature of the well bore, iv) a drilling speed, v) a circulation rate, and vi) a well path;
 wherein the averaged transverse product magnitude is evaluated according to one or more of the group:

$\langle g_{Td}h_{Td}\rangle = (E(r_3)/E(r_0))^{1/2}$; and $\langle g_{Td}h_{Td}\rangle = \sqrt{\langle \bar{g}_{Td}\bar{h}_{Td}\rangle^2 + \langle \bar{g}_{Td}\times\bar{h}_{Td}\rangle^2}$;

wherein $\langle g_{Td}h_{Td}\rangle$ represents the averaged transverse product magnitude; $\langle \bar{g}_{Td}\times\bar{h}_{Td}\rangle$ represents an averaged transverse cross product; $\langle \bar{g}_{Td}*\bar{h}_{Td}\rangle$ represents an averaged transverse dot product; $E(r_3)$ represents an energy of a correlation between a transverse gravity vector and a transverse magnetic vector; and, $E(r_0)$ represents an energy of a sensor rotation coherence.

23. A system for wellbore surveying comprising:
 a. a magnetic sensor in a wellbore;
 b. a gravity sensor in the wellbore;
 c. a means for evaluating an averaged transverse product magnitude using a sequence of transverse magnetic vectors measured by the magnetic sensor and a sequence of transverse gravity vectors measured by the gravity sensor; and,
 d. a means for using the averaged transverse product magnitude to evaluate one or more of the group: i) an inclination, and ii) an azimuth;
 e. a means for using the inclination or azimuth during drilling the well bore to adjust one or more of the group: i) a position of the well bore, ii) a drilling direction of the well bore, iii) a curvature of the well bore, iv) a drilling speed, v) a circulation rate, and vi) a well path;
 wherein the inclination or the azimuth are evaluated according to one or more of the group:

$\theta = a\tan 2(\langle g_{Td}h_{Td}\rangle / \langle h_{Td}\rangle, \langle g_{zd}\rangle)$;

$\theta = a\cos(\langle g_{zd}\rangle \langle h_{Td}\rangle / \sqrt{\langle g_{zd}\rangle^2 \langle h_{Td}\rangle^2 + \langle g_{Td}h_{Td}\rangle^2})$;

$\theta = a\sin(\langle g_{Td}h_{Td}\rangle / \sqrt{\langle g_{zd}\rangle^2 \langle h_{Td}\rangle^2 + \langle g_{Td}h_{Td}\rangle^2})$;

$$\begin{bmatrix} S_a \\ C_a \end{bmatrix} = \begin{bmatrix} \langle \bar{g}_{Td}\times\bar{h}_{Td}\rangle\langle h_{Td}\rangle\sqrt{\langle g_{zd}\rangle^2\langle h_{Td}\rangle^2 + \langle g_{Td}h_{Td}\rangle^2} \\ \langle h_{zd}\rangle\langle g_{Td}h_{Td}\rangle^2 - \langle g_{zd}\rangle\langle \bar{g}_{Td}\cdot\bar{h}_{Td}\rangle\langle h_{Td}\rangle^2 \end{bmatrix};$$

$$\begin{bmatrix} S_a \\ C_a \end{bmatrix} = \begin{bmatrix} \langle \bar{g}_{Td}\times\bar{h}_{Td}\rangle\langle h_{Td}\rangle\sqrt{\langle g_{zd}\rangle^2\langle h_{Td}\rangle^2 + \langle g_{Td}h_{Td}\rangle^2} \\ \langle h_{zd}(a,b,c)\rangle\langle g_{Td}h_{Td}\rangle^2 - \langle g_{zd}\rangle\langle \bar{g}_{Td}\cdot\bar{h}_{Td}\rangle\langle h_{Td}\rangle^2 \end{bmatrix};$$

$\gamma = a\tan 2(S_a, C_a)$;

wherein θ represents the inclination; a tan 2 is an arctangent function; $\langle g_{Td}h_{Td}\rangle$ represents the averaged transverse product magnitude; $\langle h_{Td}\rangle$ represents an averaged transverse magnetic field magnitude; $\langle g_{zd}\rangle$ represents an averaged axial gravity measurement; a cos represents an arc cosine function; a sin represents an arc sine function; $S_a$ represents a sine of the azimuth; $C_a$ represents a cosine of the azimuth; $\langle \bar{g}_{Td}\times\bar{h}_{Td}\rangle$ represents an averaged transverse cross product; $\langle \bar{g}_{Td}*\bar{h}_{Td}\rangle$ represents an averaged transverse dot product; $\langle h_{zd}\rangle$ represents an averaged axial magnetic measurement; $\langle h_{zd}(a,b,c)\rangle$ represents an axial magnetic field value based on an axial gravity measurement, a transverse gravity measurement, a transverse magnetic measurement, and a predetermined magnetic dip angle; and γ represents the azimuth.

24. A system for wellbore surveying comprising:
 a. a processor;
 b. a non-transitory computer-readable medium storing one or more instructions that, when executed by the processor, cause the processor to:
  i. evaluate an averaged transverse product magnitude using a sequence of transverse magnetic vectors measured by a magnetic sensor in a wellbore and a sequence of transverse gravity vectors measured by a gravity sensor in the wellbore according to one or more of the group:

a. $\langle g_{Td}h_{Td}\rangle = (E(r_3)/E(r_0))^{1/2}$, and b. $\langle g_{Td}h_{Td}\rangle = \sqrt{\langle \bar{g}_{Td}\bar{h}_{Td}\rangle^2 + \langle \bar{g}_{Td}\times\bar{h}_{Td}\rangle^2}$;

wherein $\langle g_{Td}h_{Td}\rangle$ represents the averaged transverse product magnitude; $\langle \bar{g}_{Td}\times\bar{h}_{Td}\rangle$ represents an averaged transverse cross product; $\langle \bar{g}_{Td}*\bar{h}_{Td}\rangle$ represents an averaged transverse dot product; $E(r_3)$ represents an energy of a correlation between a transverse gravity vector and a transverse magnetic vector; and, $E(r_0)$ represents an energy of a sensor rotation coherence; and ii. use the average transverse product magnitude to evaluate one or more of the group: a) an inclination, and b) an azimuth;

c. a means for using the inclination or azimuth during drilling to adjust one or more of the group: i) a position of the wellbore, ii) a drilling direction of the well bore, iii) a curvature of the well bore, iv) a drilling speed, v) a circulation rate, and vi) a well path.

25. The system of claim 24 wherein the inclination or the azimuth are evaluated according to one or more of the group:

a. $\theta = a\tan 2(\langle g_{Td}h_{Td}\rangle \langle h_{Td}\rangle, \langle g_{zd}\rangle)$, b. $\theta = a\cos(\langle g_{zd}\rangle \langle h_{Td}\rangle / \sqrt{\langle g_{zd}\rangle^2 \langle h_{Td}\rangle^2 + \langle g_{Td}h_{Td}\rangle^2})$ c. $\theta = a\sin(\langle g_{Td}h_{Td}\rangle / \sqrt{\langle g_{zd}\rangle^2 \langle h_{Td}\rangle^2 + \langle g_{Td}h_{Td}\rangle^2})$, d. $\begin{bmatrix} S_a \\ C_a \end{bmatrix} = \begin{bmatrix} \langle \bar{g}_{Td} \times \bar{h}_{Td}\rangle \langle h_{Td}\rangle \sqrt{\langle g_{zd}\rangle^2 \langle h_{Td}\rangle^2 + \langle g_{Td}h_{Td}\rangle^2} \\ \langle h_{zd}\rangle \langle g_{Td}h_{Td}\rangle^2 - \langle g_{zd}\rangle \langle \bar{g}_{Td}\cdot \bar{h}_{Td}\rangle \langle h_{Td}\rangle^2 \end{bmatrix}$;

e. $\begin{bmatrix} S_a \\ C_a \end{bmatrix} = \begin{bmatrix} \langle \bar{g}_{Td} \times \bar{h}_{Td}\rangle \langle h_{Td}\rangle \sqrt{\langle g_{zd}\rangle^2 \langle h_{Td}\rangle^2 + \langle g_{Td}h_{Td}\rangle^2} \\ \langle h_{zd}(a,b,c)\rangle \langle g_{Td}h_{Td}\rangle^2 - \langle g_{zd}\rangle \langle \bar{g}_{Td}\cdot \bar{h}_{Td}\rangle \langle h_{Td}\rangle^2 \end{bmatrix}$;

$\gamma = a\tan 2(S_a, C_a)$, wherein $\theta$ represents the inclination; a tan 2 is an arctangent function; $\langle g_{Td}h_{Td}\rangle$ represents the averaged transverse product magnitude; $\langle h_{Td}\rangle$ represents an averaged transverse magnetic field magnitude; $\langle g_{Td}\rangle$ represents an averaged axial gravity measurement; a cos represents an arc cosine function; a sin represents an arc sine function; $S_a$ represents a sine of the azimuth; $C_a$ represents a cosine of the azimuth; $\langle \bar{g}_{Td}\times\bar{h}_{Td}\rangle$ represents an averaged transverse cross product; $\langle \bar{g}_{Td}\times\bar{h}_{Td}\rangle$ represents an averaged transverse dot product; $\langle h_{zd}\rangle$ represents an averaged axial magnetic measurement; $\langle h_{zd}(a,b,c)\rangle$ represents an axial magnetic field value based on an axial gravity measurement, a transverse gravity measurement, a transverse magnetic measurement, and a predetermined magnetic dip angle; and $\gamma$ represents the azimuth.

26. A system for wellbore surveying including:

a. a magnetic sensor in a wellbore;

b. a gravity sensor in the wellbore;

c. a means for evaluating an averaged transverse product magnitude using a sequence of transverse magnetic vectors measured by the magnetic sensor and a sequence of transverse gravity vectors measured by the gravity sensor; wherein, the averaged transverse product magnitude is evaluated according to one or more of the group:

$\langle g_{Td}h_{Td}\rangle = (E(r_3)/E(r_0))^{1/2}$, and $\langle g_{Td}h_{Td}\rangle = \sqrt{\langle \bar{g}_{Td}\cdot\bar{h}_{Td}\rangle^2 + \langle \bar{g}_{Td}\times\bar{h}_{Td}\rangle^2}$;

wherein $\langle g_{Td}h_{Td}\rangle$ represents the averaged transverse product magnitude; $\langle \bar{g}_{Td}\times\bar{h}_{Td}\rangle$ represents an averaged transverse cross product; $\langle \bar{g}_{Td}*\bar{h}_{Td}\rangle$ represents an averaged transverse dot product; $E(r_3)$ represents an energy of a correlation between a transverse gravity vector and a transverse magnetic vector; and, $E(r_0)$ represents an energy of a sensor rotation coherence; and d. a means for using the averaged transverse product magnitude to evaluate one or more of the group: i) an inclination, and ii) an azimuth, and e. a means for using the inclination or azimuth during drilling the well bore to adjust one or more of the group: i) a position of the well bore, ii) a drilling direction of the well bore, iii) a curvature of the wellbore, iv) a drilling speed, v) a circulation rate, and vi) a well path.

27. The system of claim 26 wherein the inclination or the azimuth are evaluated according to one or more of the group:

a. $\theta = a\tan 2(\langle g_{Td}h_{Td}\rangle \langle h_{Td}\rangle, \langle g_{zd}\rangle)$;

b. $\theta = a\cos(\langle g_{zd}\rangle \langle h_{Td}\rangle / \sqrt{\langle g_{zd}\rangle^2 \langle h_{Td}\rangle^2 + \langle g_{Td}h_{Td}\rangle^2})$;

c. $\theta = a\sin(\langle g_{Td}h_{Td}\rangle / \sqrt{\langle g_{zd}\rangle^2 \langle h_{Td}\rangle^2 + \langle g_{Td}h_{Td}\rangle^2})$;

d. $\begin{bmatrix} S_a \\ C_a \end{bmatrix} = \begin{bmatrix} \langle \bar{g}_{Td} \times \bar{h}_{Td}\rangle \langle h_{Td}\rangle \sqrt{\langle g_{zd}\rangle^2 \langle h_{Td}\rangle^2 + \langle g_{Td}h_{Td}\rangle^2} \\ \langle h_{zd}\rangle \langle g_{Td}h_{Td}\rangle^2 - \langle g_{zd}\rangle \langle \bar{g}_{Td}\cdot \bar{h}_{Td}\rangle \langle h_{Td}\rangle^2 \end{bmatrix}$;

e. $\begin{bmatrix} S_a \\ C_a \end{bmatrix} = \begin{bmatrix} \langle \bar{g}_{Td} \times \bar{h}_{Td}\rangle \langle h_{Td}\rangle \sqrt{\langle g_{zd}\rangle^2 \langle h_{Td}\rangle^2 + \langle g_{Td}h_{Td}\rangle^2} \\ \langle h_{zd}(a,b,c)\rangle \langle g_{Td}h_{Td}\rangle^2 - \langle g_{zd}\rangle \langle \bar{g}_{Td}\cdot \bar{h}_{Td}\rangle \langle h_{Td}\rangle^2 \end{bmatrix}$;

f. $\gamma = a\tan 2(S_a, C_a)$;

wherein $\theta$ represents the inclination; a tan 2 is an arctangent function; $\langle g_{Td}h_{Td}\rangle$ represents the averaged transverse product magnitude; $\langle h_{Td}\rangle$ represents an averaged transverse magnetic field magnitude; $\langle g_{zd}\rangle$ represents an averaged axial gravity measurement; a cos represents an arc cosine function; a sin represents an arc sine function; $S_a$ represents a sine of the azimuth; $C_a$ represents a cosine of the azimuth; $\langle \bar{g}_{Td}\times\bar{h}_{Td}\rangle$ represents an averaged transverse cross product; $\langle \bar{g}_{Td}\times\bar{h}_{Td}\rangle$ represents an averaged transverse dot product; $\langle h_{zd}\rangle$ represents an averaged axial magnetic measurement; $\langle h_{zd}(a,b,c)\rangle$ represents an axial magnetic field value based on an axial gravity measurement, a transverse gravity measurement, a transverse magnetic measurement, and a predetermined magnetic dip angle; and $\gamma$ represents the azimuth.

\* \* \* \* \*